United States Patent
Choi et al.

(10) Patent No.: US 11,702,545 B2
(45) Date of Patent: Jul. 18, 2023

(54) NANOPROBE-METAL CHELATOR COMPLEXES

(71) Applicants: The General Hospital Corporation, Boston, MA (US); Northeastern University, Boston, MA (US)

(72) Inventors: Hak Soo Choi, Needham, MA (US); Jonghan Kim, Cambridge, MA (US); Georges El Fakhri, Brookline, MA (US)

(73) Assignees: The General Hospital Corporation, Boston, MA (US); Northeastern University, Boston, MA (US)

( * ) Notice: Subject to any disclaimer, the term of this patent is extended or adjusted under 35 U.S.C. 154(b) by 0 days.

(21) Appl. No.: 17/733,766

(22) Filed: Apr. 29, 2022

(65) Prior Publication Data
US 2022/0363905 A1 Nov. 17, 2022

Related U.S. Application Data

(63) Continuation of application No. 17/129,380, filed on Dec. 21, 2020, now Pat. No. 11,339,294, which is a continuation of application No. 16/484,722, filed as application No. PCT/US2017/039888 on Jun. 29, 2017, now Pat. No. 10,907,046.

(60) Provisional application No. 62/456,210, filed on Feb. 8, 2017.

(51) Int. Cl.
*C09B 23/01* (2006.01)
*C09B 69/10* (2006.01)

(52) U.S. Cl.
CPC ...... *C09B 23/0066* (2013.01); *C09B 23/0025* (2013.01); *C09B 23/0033* (2013.01); *C09B 23/0041* (2013.01); *C09B 69/105* (2013.01)

(58) Field of Classification Search
None
See application file for complete search history.

(56) References Cited

U.S. PATENT DOCUMENTS

| 10,907,046 B2 | 2/2021 | Choi |
| 2010/0143960 A1 | 6/2010 | Bazin |
| 2011/0054188 A1 | 3/2011 | Koori et al. |
| 2016/0347727 A1 | 12/2016 | Frangioni et al. |

OTHER PUBLICATIONS

Bofill et al., "Response to repeated phlebotomies in patients with non-insulin-dependent diabetes mellitus," Metabolism, May 1, 1994. 43(5):614-20.
Casanova-Esteban et al., "Effect of phlebotomy on lipid metabolism in subjects with hereditary hemochromatosis," Metabolism, Jun. 1, 2011, 60(6):830-4.
Fernández-Real et al., "Blood letting in high-ferritin type 2 diabetes: effects on insulin sensitivity and β-cell function," Diabetes. Apr. 1, 2002, 51(4):1000-4.
Ford et al., "Diabetes and serum ferritin concentration among US adults," Diabetes Care, Dec. 1, 1999, 22(12):1978-83.
Fumeron et al., "Ferritin and transferrin are both predictive of the onset of hyperglycemia in men and women over 3 years: the data from an epidemiological study on the Insulin Resistance Syndrome (DESIR) study," Diabetes Care, Sep. 2006, 29(9):2090-4.
Gulati et al., "Cardiac involvement in hemochromatosis," Cardiology in Review, Mar. 1, 2014, 22(2):56-68.
Imran ul-haq et al., "Design of long circulating nontoxic dendritic polymers for the removal of iron in vivo," ACS Nano, Dec. 23, 2013, 7(12):10704-16.
Li et al., "Functionalization of the surface of electrospun poly(epsilon-caprolactone) mats using zwitterionic poly(carbosybetaine methacrylate) and cell-specific peptide for endothelial progenitor cells capture," Materials Science and Engineering C, Apr. 1, 2013, 33:1646-53.
Liu et al., "Enzymatically Biodegradable Polyrotaxane-Deferoxamine Conjugates for Iron Chelation," ACS Applied Materials & Interfaces, Oct. 5, 2016, 8(39):25788-97.
Murphy et al., "Iron-overload cardiomyopathy: pathophysiology, diagnosis, and treatment," Journal of Cardiac Failure, Nov. 1, 2010, 16(11):888-900.
PCT International Preliminary Report on Patentability in PCT/US2017/039888, dated Aug. 13, 2019, 8 pages.
PCT International Search Report and Written Opinion in International Appln. No. PCT/US2017/039888, dated Nov. 17, 2017, 11 pages.
Pietrangelo., "Hereditary hemochromatosis: pathogenesis, diagnosis, and treatment," Gastroenterology, Aug. 1, 2010, 139(2):393-408.
Science of Synthesis Knowledge Updates 2011 KU 1, Abstract, Thieme, 2010, 13 pages.
Science of Synthesis Knowledge Updates 2011 KU 1, Abstract, Thieme, 2011, 4 pages.
Science of Synthesis Knowledge Updates 2011 KU 1, Abstract, Thieme, 2012, 8 pages.
Science of Synthesis Knowledge Updates 2011 KU 2, Abstract, Thieme, 2010, 1 page.
Science of Synthesis Knowledge Updates 2011 KU 2, Abstract, Thieme, 2011, 4 pages.
Science of Synthesis Knowledge Updates 2011 KU 2, Abstract, Thieme, 2012, 7 pages.
Science of Synthesis Knowledge Updates 2011 KU 3, Abstract, Thieme, 2010, 6 pages.
Science of Synthesis Knowledge Updates 2011 KU 3, Abstract, Thieme, 2011, 8 pages.
Science of Synthesis Knowledge Updates 2011 KU 3, Abstract, Thieme, 2012, 7 pages.

(Continued)

*Primary Examiner* — Joseph R Kosack
(74) *Attorney, Agent, or Firm* — Fish & Richardson P.C.

(57) ABSTRACT

Provided herein are compounds that are able to bind metal ions (e.g., free metal ions or metal ions bound to low affinity ligands) in a sample or subject. Also provided herein are methods of using the compounds for chelating metal ions and for the treatment of diseases associated with abnormal levels of metal ions. Methods of preparing the compounds and pharmaceutical compositions are also provided.

21 Claims, 17 Drawing Sheets

(56) References Cited

OTHER PUBLICATIONS

Science of Synthesis Knowledge Updates 2011 KU 4, Abstract, Thieme, 2010, 10 pages.
Science of Synthesis Knowledge Updates 2011 KU 4, Abstract, Thieme, 2011, 6 pages.
Science of Synthesis Knowledge Updates 2011 KU 4, Abstract, Thieme, 2012, 6 pages.
Sullivan et al., "Current status of the iron hypothesis of cardiovascular diseases," Recenti Progressi in Medicina, Jun. 30, 2007, 98(7-8):373-7 (with English abstract).
Sun et al., "Ferritin concentrations, metabolic syndrome, and type 2 diabetes in middle-aged and elderly Chinese," The Journal of Clinical Endocrinology & Metabolism, Dec. 1, 2008, 93(12):4690-6.
Vari et al., "Ferritin and transferrin are associated with metabolic syndrome abnormalities and their change over time in a general population: Data from an Epidemiological Study on the Insulin Resistance Syndrome (DESIR)," Diabetes Care, Jul. 1, 2007, 30(7):1795-801.

NANOPROBE-METAL CHELATOR COMPLEXES

CROSS-REFERENCE TO RELATED APPLICATIONS

This application is a continuation of U.S. patent application Ser. No. 17/129,380, filed Dec. 21, 2020, which is a continuation of U.S. patent application Ser. No. 16/484,722, filed Aug. 8, 2019, now U.S. Pat. No. 10,907,046, which is a § 371 national stage application of International Application No. PCT/US2017/039888, filed on Jun. 29, 2017, which claims the benefit of U.S. Provisional Application Ser. No. 62/456,210, filed Feb. 8, 2017, the disclosure of which is incorporated herein by reference in its entirety.

FEDERALLY SPONSORED RESEARCH OR DEVELOPMENT

This invention was made with Government support under Grant No. R01-EB-011523 and R00-ES-017781, awarded by the National Institutes of Health. The Government has certain rights in the invention.

TECHNICAL FIELD

Provided herein are compounds (e.g., nanochelator compounds) useful for binding metal ions (e.g., free metal ions). Also provided are methods of using the compounds for chelating metal ions and treating diseases associated with abnormal levels of metal ions in a subject.

BACKGROUND

Iron is an essential metal, but high iron stores are toxic due to increased oxidative stress produced by iron-catalyzed reactive oxygen species (ROS). Increased iron stores are also associated with well-established risk factors of heart and liver failure, arthritis, dyslipidemia and diabetes, including obesity, metabolic syndrome and chronic inflammation (see e.g., Pietrangelo et al, *Gastroenterology*, 2010, 139: 393-408; Murphy et al, *J. Card. Fail.* 2010, 16:888-900; Fumeron et al, *Diabetes Care*, 2006, 29:2090-2094; Sun et al, *The Journal of Clinical Endocrinology andMetabolism*, 2008, 93:4690-4696; Vari et al, *Diabetes Care*, 2007, 30:1795-1801; and Casanova-Esteban et al, *Metabolism: Clinical andExperimental*, 60:830-834), particularly for individuals with genetic susceptibility for primary and secondary iron overload. Conversely, a reduction of iron stores by phlebotomy, iron chelation therapy, or iron-restricted diet has been shown to improve heart diseases, diabetes, and Alzheimer's disease (see e.g., Gulati et al, *Cariol. Rev.* 2014, 22:56-68; Sullivan et al, *Recenti. Prog. Med.* 2007, 98:373-377; Bofill et al, *Metabolism: Clinical and Experimental*, 1994, 43:614-620, Fernandex-Real, *Diabetes*, 2002, 51:1000-1004; and Ford et al, *Diabetes Care*, 1999, 22:1978-1983.

SUMMARY

The present application provides, inter alia, a compound of Formula I:

A-B or a pharmaceutically acceptable salt thereof, wherein:
A is a group comprising a zwitterion;
B is a biocompatible polymer substituted by one or more C groups and one or more -D-E groups;
each C is independently selected from the group consisting of H and an anionic group;
each D is an independently selected linking group; and
each E is an independently selected metal chelating group.

In some embodiments, A comprises one or more cationic groups each independently selected from the group consisting of ammonium, $C_{1-6}$ alkylammonium, di($C_{1-6}$ alkyl)ammonium, tri($C_{1-6}$ alkyl)ammonium, a cationic 5-10 membered heteroaryl group, and a cationic 4-10 membered heterocycloalkyl group, wherein the cationic 5-10 membered heteroaryl group and cationic 4-10 membered heterocycloalkyl group are each optionally substituted by 1, 2, 3, or 4 independently selected $C_{1-6}$ alkyl groups. In some embodiments, A comprises one or more cationic groups which are each independently selected from the group consisting of tri($C_{1-6}$ alkyl)ammonium and a cationic 5-10 membered heteroaryl group which is optionally substituted by 1, 2, 3, or 4 independently selected $C_{1-6}$ alkyl groups. In some embodiments, A comprises one or more cationic groups which are each independently selected from the group consisting of trimethylammonium and N—($C_{1-6}$ alkyl)indolium, wherein the N—($C_{1-6}$ alkyl)indolium is optionally substituted by 1 or 2 independently selected $C_{1-6}$ alkyl groups.

In some embodiments, A comprises one or more anionic groups each independently selected from the group consisting of oxide, carbonate, carboxylate, phosphate, sulfide, sulfinate, and sulfonate. In some embodiments, A comprises one or more anionic groups which are each sulfonate.

In some embodiments, A is selected from the group consisting of formulas A-1 and A-2:

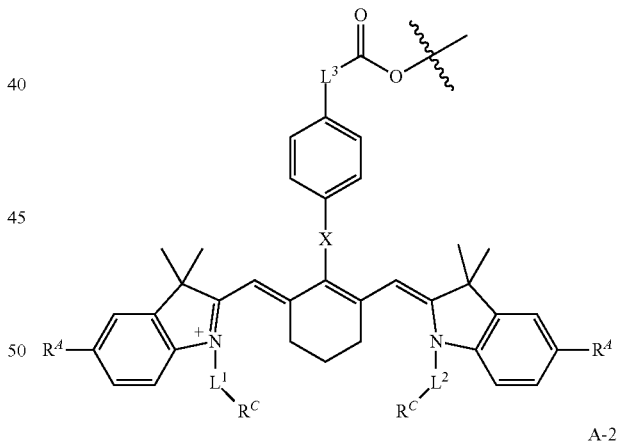

A-1

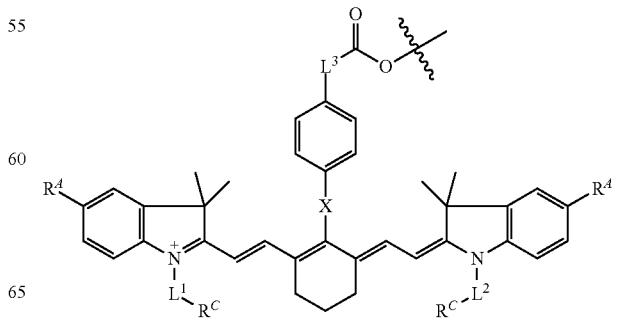

A-2 wherein:

〰️ indicates the bond between A and B;

X is selected from the group consisting of a bond, C, $CH_2$, NH, O and S;

each $R^A$ is an independently selected anionic group;

each $R^C$ is an independently selected cationic group; and $L^1$, $L^2$, and $L^3$ are each an independently selected $C_{1-6}$ alkylene group.

In some embodiments, each $R^C$ is independently selected from the group consisting of ammonium, $C_{1-6}$ alkylammonium, di($C_{1-6}$ alkyl)ammonium, and tri($C_{1-6}$ alkyl)ammonium. In some embodiments, each $R^C$ is an independently selected tri($C_{1-6}$ alkyl)ammonium group. In some embodiments, each $R^C$ is trimethylammonium.

In some embodiments, each $R^A$ is independently selected from the group consisting of oxide, carbonate, carboxylate, phosphate, sulfide, sulfinate, and sulfonate. In some embodiments, each $R^A$ is sulfonate.

In some embodiments, $L^1$ is propylene.

In some embodiments, $L^2$ is propylene.

In some embodiments, $L^3$ is ethylene.

In some embodiments, X is a bond. In some embodiments, X is $CH_2$.

In some embodiments, A is:

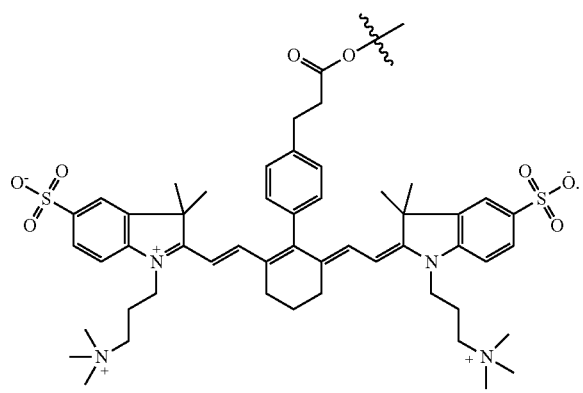

In some embodiments, B is selected from the group consisting of a biocompatible polypeptide and a biocompatible polyester, each of which is substituted by one or more C groups and one or more -D-E groups. In some embodiments, B is selected from the group consisting of polylysine, polylactic acid, poly(lactic-co-glycolic acid), polyaspartic acid, polyglutamic acid, and polyglutamic acid-poly(ethylene glycol) copolymer, each of which is substituted by one or more C groups and one or more -D-E groups. In some embodiments, B is polylysine substituted by one or more C groups and one or more -D-E groups. In some embodiments, the polylysine is ε-poly-L-lysine substituted by one or more C groups and one or more -D-E groups.

In some embodiments, B is:

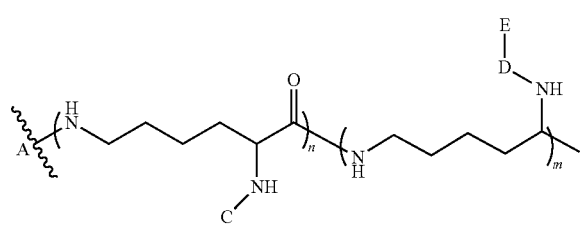

wherein:

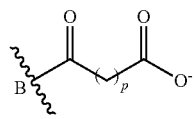 indicates the bond between B and A; and n is an integer from 5 to 30; and m is an integer from 1 to 10.

In some embodiments, B has a hydrodynamic radius of from about 1 nm to about 10 nm.

In some embodiments, each C is independently selected from the group consisting of hydrogen and an anionic group comprising one or more alkylene groups, one or more carbonyl groups, or one or more carboxyl groups, or any combination thereof.

In some embodiments, C is an anionic group of the following formula:

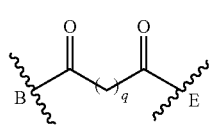

wherein:

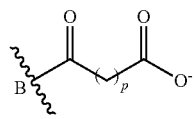 indicates the bond between C and B; and p is an integer from 1 to 10.

In some embodiments, p is an integer from 1 to 5.

In some embodiments, D is a linking group comprising one or more alkylene groups, one or more carbonyl groups, or one or more carboxyl groups, or any combination thereof.

In some embodiments, D is a linking group of the following formula:

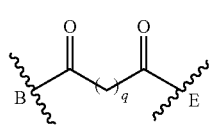

wherein:

〰️ indicates the bond between D and B;

〰️ indicates the bond between D and E; and q is an integer from 1 to 10.

In some embodiments, q is an integer from 1 to 5.

In some embodiments, E is selected from the group consisting of an iron chelating group, a lead chelating group, a copper chelating group, an arsenic chelating group, a mercury chelating group, and a manganese chelating group. In some embodiments, E is an iron chelating group. In some embodiments, E is selected from the group consisting of dimercaptosuccinic acid, dimercaprol, ethylenediaminetetraacetic acid, p-aminosalicyclic acid, D-penicillamine, deferoxamine, deferiprone, and deferasirox. In some embodiments, E is deferoxamine.

In some embodiments, B is polylysine and E is an iron chelating group, wherein the polylysine is substituted by one or more C groups and one or more -D-E groups. In some embodiments, the polylysine is ε-poly-L-lysine (i.e., EPL) substituted by one or more C groups and one or more -D-E groups. In some embodiments, B is ε-poly-L-lysine and E is deferoxamine (i.e., DFO), wherein the ε-poly-L-lysine is substituted by one or more C groups and one or more -D-E groups.

In some embodiments, the molar ratio (i.e., stoichiometry) of the metal chelating agent E (e.g., an iron chelating agent)

to the biocompatible polymer B in the compounds of Formula I is from about 10:1 to about 1:1, for example, about 10:1 to about 2:1, about 10:1 to about 4:1, about 10:1 to about 6:1, about 10:1 to about 8:1, about 8:1 to about 1:1, about 8:1 to about 2:1, about 8:1 to about 4:1, about 8:1 to about 6:1, about 6:1 to about 1:1, about 6:1 to about 2:1, about 6:1 to about 4:1, about 4:1 to about 1:1, about 4:1 to about 2:1, or about 2:1 to about 1:1.

In some embodiments, the molar ratio (i.e., stoichiometry) of the metal chelating agent E (e.g., an iron chelating agent) to the biocompatible polymer B in the compounds of Formula I is about 2:1, about 4:1, about 6:1, or about 8:1.

In some embodiments:

A is selected from the group consisting of formulas A-1 and A-2:

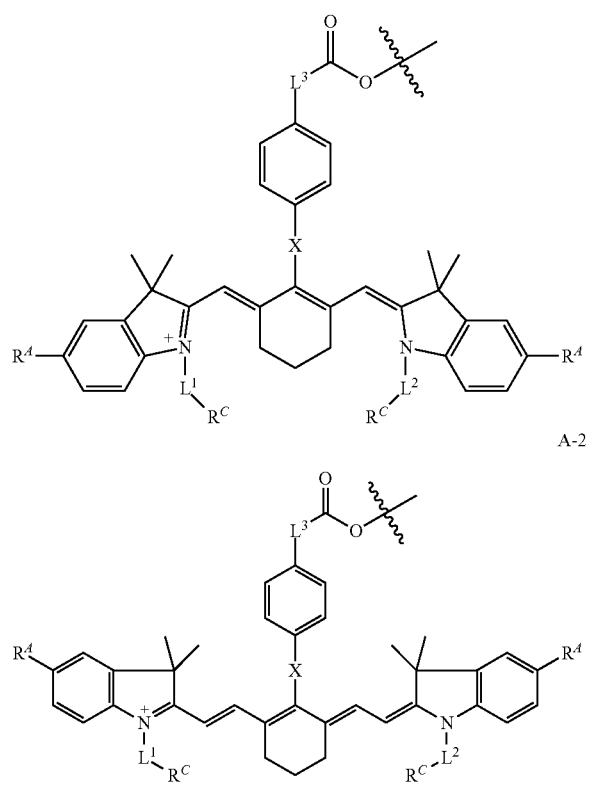

wherein:

‿‿‿ indicates the bond between A and B;
each $R^A$ is an independently selected anionic group;
each $R^C$ is an independently selected cationic group; and
$L^1$, $L^2$, and $L^3$ are each an independently selected $C_{1-6}$ alkylene group;

B is selected from the group consisting of a biocompatible polypeptide and a biocompatible polyester, each of which is substituted by one or more C groups and one or more -D-E groups;

C is an anionic group of the following formula:

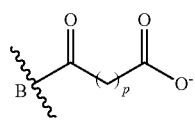

wherein:

$\overset{B}{\sim\!\sim\!\sim}$ indicates the bond between C and B;
p is an integer from 1 to 10;
D is a linking group of the following formula:

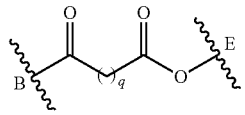

wherein:

$\overset{B}{\sim\!\sim\!\sim}$ indicates the bond between D and B;
$\overset{E}{\sim\!\sim\!\sim}$ indicates the bond between D and E; and
q is an integer from 1 to 10; and
E is a metal chelating group.

In some embodiments:

A is a group of the following formula:

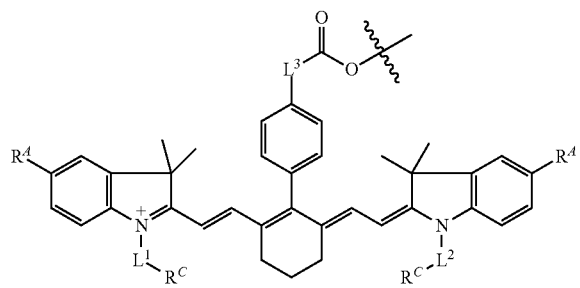

wherein:

‿‿‿ indicates the bond between A and B;
each $R^A$ is independently selected from the group consisting of oxide, carbonate, carboxylate, phosphate, sulfide, sulfinate, and sulfonate;
each $R^C$ is independently selected from the group consisting of ammonium, $C_{1-6}$ alkylammonium, di($C_{1-6}$ alkyl) ammonium, and tri($C_{1-6}$ alkyl)ammonium; and
$L^1$, $L^2$, and $L^3$ are each an independently selected $C_{1-6}$ alkylene group;

B is selected from the group consisting of polylysine, polylactic acid, and poly(lactic-co-glycolic acid), polyaspartic acid, polyglutamic acid, and polyglutamic acid-poly (ethylene glycol) copolymer, each of which are substituted by one or more C groups and one or more -D-E groups;

C is an anionic group of the following formula:

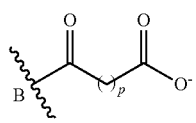

wherein:

$\overset{B}{\sim\!\sim\!\sim}$ indicates the bond between C and B;
p is an integer from 1 to 10;

D is a linking group of the following formula:

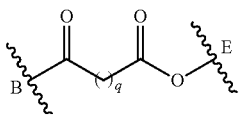

wherein:
$\overset{B}{\sim}$ indicates the bond between D and B;
$\overset{E}{\sim}$ indicates the bond between D and E; and
q is an integer from 1 to 10; and
E is a metal chelating group.
In some embodiments:
A is a group of the following formula:

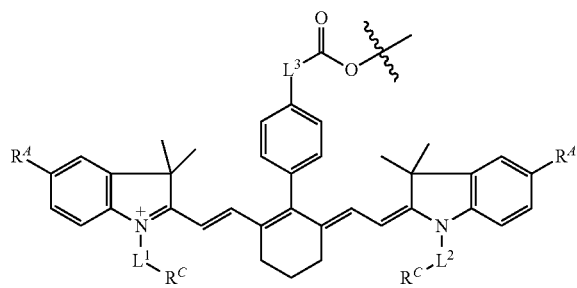

wherein:
$\sim$ indicates the bond between A and B;
each $R^A$ is sulfonate;
each $R^C$ is tri($C_{1-6}$ alkyl)ammonium; and
$L^1$, $L^2$, and $L^3$ are each an independently selected $C_{1-6}$ alkylene group;
B is polylysine which is substituted by one or more C groups and one or more -D-E groups;
C is an anionic group of the following formula:
wherein:

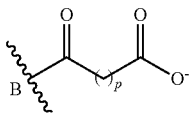

$\overset{B}{\sim}$ indicates the bond between C and B;
p is an integer from 1 to 5;
D is a linking group of the following formula:

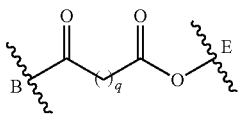

wherein:
$\overset{B}{\sim}$ indicates the bond between D and B;
$\overset{E}{\sim}$ indicates the bond between D and E; and
q is an integer from 1 to 5; and
E is a metal chelating group.

In some embodiments, E is selected from the group consisting of an iron chelating group, a lead chelating group, and a copper chelating group. In some embodiments, E is an iron chelating group. In some embodiments, E is selected from the group consisting of dimercaptosuccinic acid, dimercaprol, ethylenediaminetetraacetic acid, P-aminosalicyclic acid, D-penicillamine, deferoxamine, deferiprone, and deferasirox. In some embodiments, E is deferoxamine.

The present application further provides a pharmaceutical composition comprising the compound provided herein (e.g., a compound of Formula I), or a pharmaceutically acceptable salt thereof, and a pharmaceutically acceptable carrier.

The present application further provides a method of chelating a metal ion in a cell or tissue sample, comprising contacting the cell sample or tissue sample with a compound provided herein (e.g., a compound of Formula I), or a pharmaceutically acceptable salt thereof.

The present application further provides a method of reducing the amount of free metal ions in a cell or tissue sample, comprising contacting the cell or tissue sample with a compound provided herein (e.g., a compound of Formula I), or a pharmaceutically acceptable salt thereof.

The present application further provides a method of chelating metal ions in a subject, comprising administering to the subject a therapeutically effective amount of a compound provided herein (e.g., a compound of Formula I), or a pharmaceutically acceptable salt thereof.

The present application further provides a method of reducing the amount of free metal ions in a subject, comprising administering to the subject a compound provided herein (e.g., a compound of Formula I), or a pharmaceutically acceptable salt thereof.

The present application further provides a method of reducing the amount of free metal ions in a subject, comprising:
i) diagnosing the subject as having an abnormal level of free metal ions; and
ii) administering to the subject a therapeutically effective amount of a compound provided herein (e.g., a compound of Formula I), or a pharmaceutically acceptable salt thereof.

The present application further provides a method of reducing the amount of free metal ions in a subject, comprising administering to a subject determined to have an abnormal level of free metal ions a therapeutically effective amount of a compound provided herein (e.g., a compound of Formula I), or a pharmaceutically acceptable salt thereof.

The present application further provides a method of treating a disease associated with an abnormal amount of free metal ions in a subject, comprising administering to a subject determined to have an abnormal level of free metal ions a compound provided herein (e.g., a compound of Formula I), or a pharmaceutically acceptable salt thereof.

In some embodiments, the disease is associated with an abnormal amount of iron ions, an abnormal amount of lead ions, or an abnormal amount of copper ions in the subject, or any combination thereof. In some embodiments, the disease is associated with an abnormal amount of iron ions in the subject.

In some embodiments, the disease is selected from the group consisting of transfusion hemosiderosis, hemochromatosis, Wilson's disease, copper poisoning, and heavy metal poisoning.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

DESCRIPTION OF DRAWINGS

FIG. 2A shows iron binding capacity in TBS; FIG. 2B shows iron binding capacity in serum from mice with iron overload hemochromatosis; and FIG. 2C shows iron binding capacity in serum from rats with iron overload hemoglobinopathy.

DETAILED DESCRIPTION

Figure 1A:
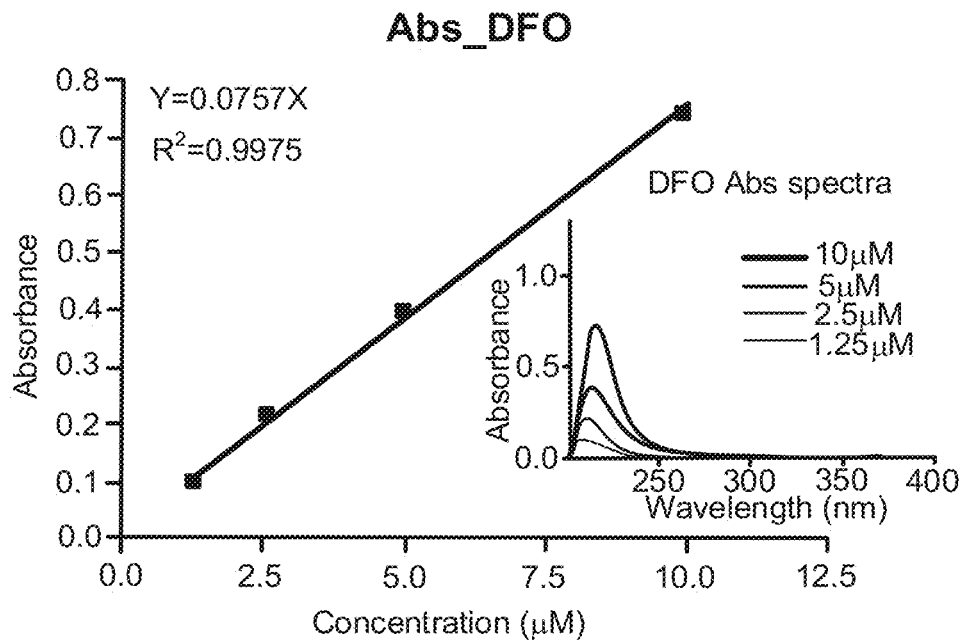
FIGS. 1A-1B show the ultra-violet (UV) absorption spectra of nanochelators ZW-EPL- and DFO-ZW-EPL$^-$.
Figure 1B:
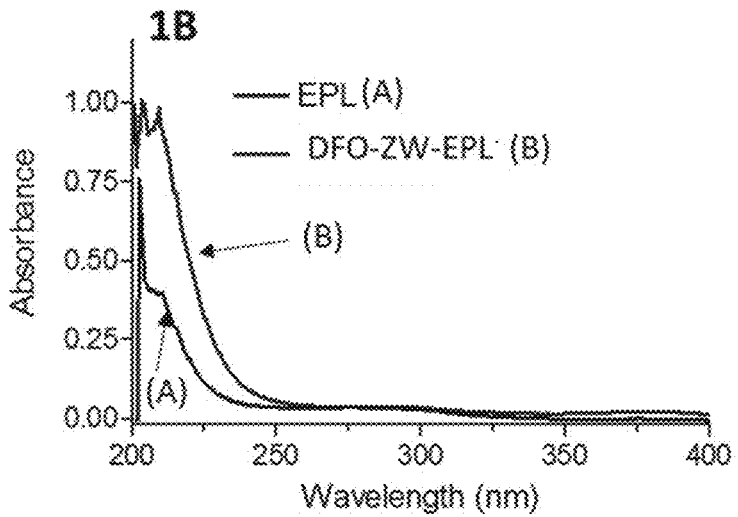
Figure 1C:
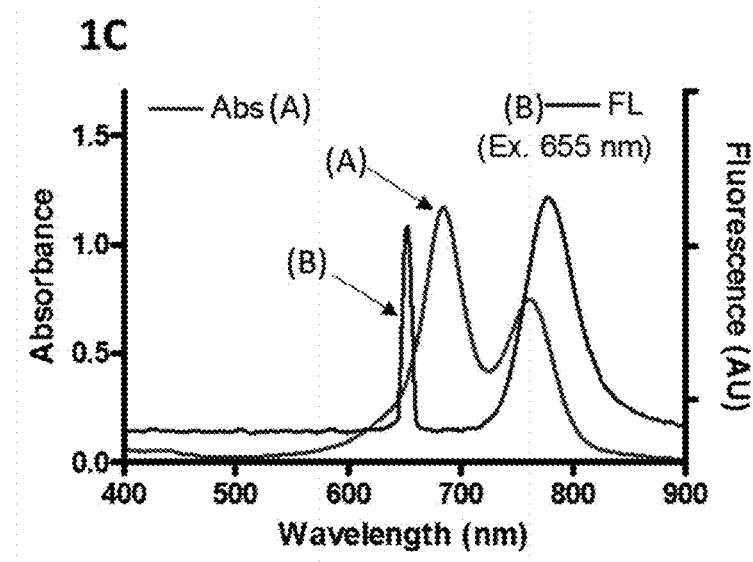
FIGS. 1C-1E show the optical properties of nanochelator DFO-ZW-EPL- (FIG. 1C) and the HPLC spectra of DFO-ZW-EPL- (FIGS. 1D-1E).
Figure 1D:
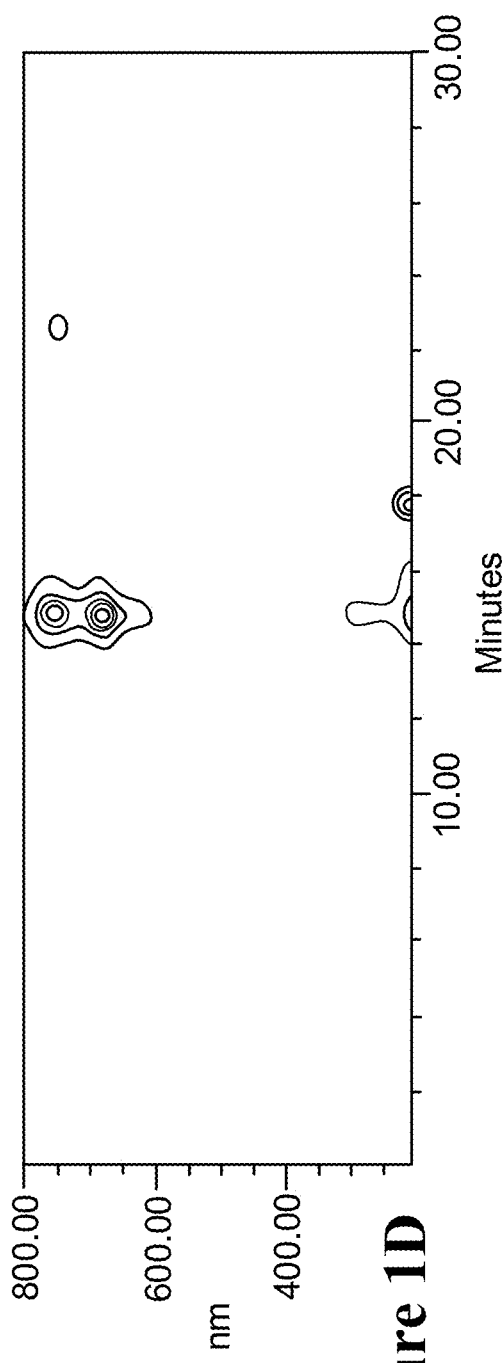
Figure 1E:
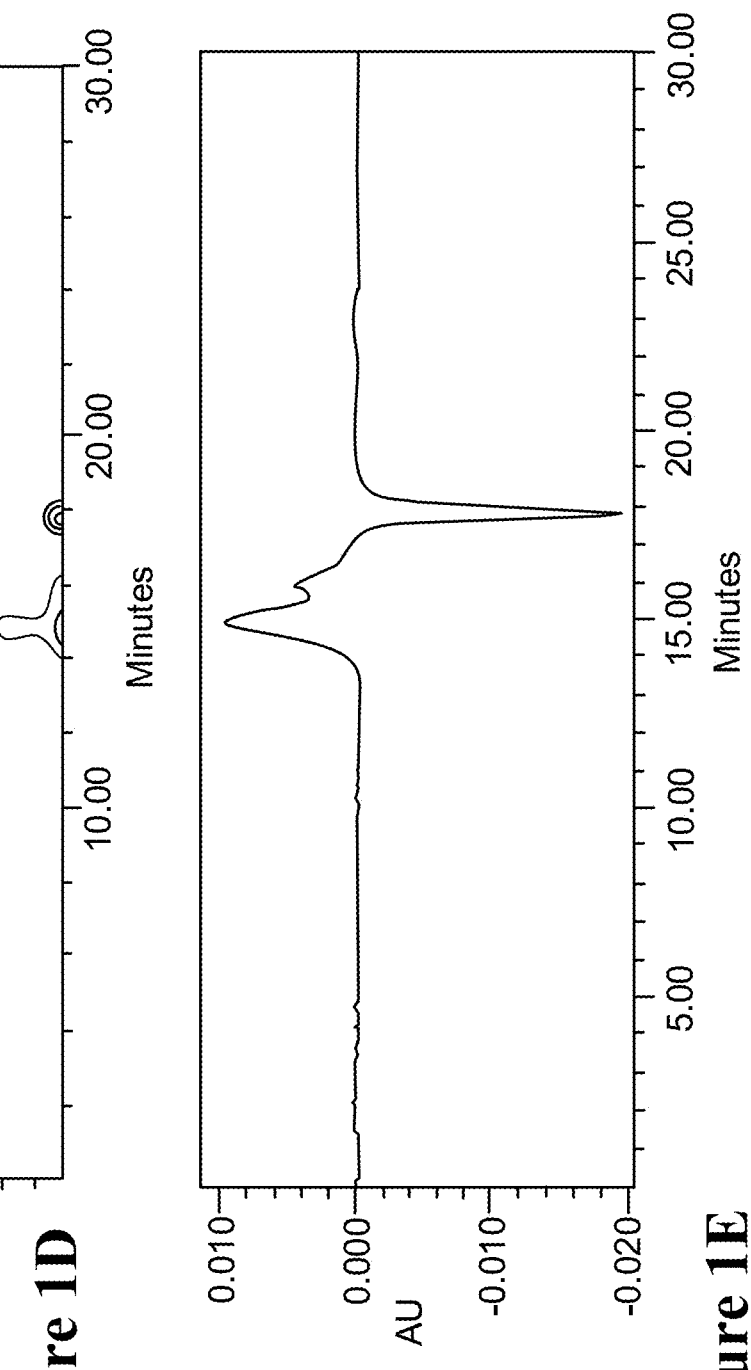

Because there is no recognized active pathway of iron excretion, a disposal of extra iron from the body is the primary therapeutic goal of treating patients with iron overload. The chelation therapy has been used to improve disease conditions in patients with iron overload, particularly transfusion-associated iron loading. However, iron chelators have serious adverse effects. While there are three FDA-approved iron chelators, the use of these chelators is limited because of non-specific distribution in non-target tissues, which may result in toxicities including hypotension, tachycardia, agranulocytosis, neutropenia, central nervous system (CNS) and ocular/auditory toxicity, musculo-skeletal-joint pains, gastrointestinal disturbances, and even death. There is therefore a need to establish new therapeutic strategies using safer chelators.

Accordingly, the present application provides compound (e.g., nanoprobes or "NPs") that covalently bind metal chelators (e.g., "nanochelators") and thereby limit drug distribution into non-target tissues, while efficiently capturing plasma metal ions (e.g., iron ions) and being cleared, for example, via urine.

Compounds

The present application provides a compound of Formula I:

$$A\text{-}B \qquad \qquad I$$

or a pharmaceutically acceptable salt thereof, wherein:

A is a group comprising a zwitterion;

B is a biocompatible polymer substituted by one or more C groups and one or more -D-E groups;

each C is independently selected from the group consisting of H and an anionic group;

each D is an independently selected linking group; and each E is an independently selected metal chelating group.

In some embodiments, A comprises one or more cationic groups each independently selected from the group consisting of ammonium, $C_{1-6}$ alkylammonium, di($C_{1-6}$ alkyl)ammonium, tri($C_{1-6}$ alkyl)ammonium, a cationic 5-10 membered heteroaryl group, and a cationic 4-10 membered heterocycloalkyl group, wherein the cationic 5-10 membered heteroaryl group and cationic 4-10 membered heterocycloalkyl group are each optionally substituted by 1, 2, 3, or 4 independently selected $C_{1-6}$ alkyl groups. In some embodiments, A comprises one or more cationic groups which are each independently selected from the group consisting of tri($C_{1-6}$ alkyl)ammonium and a cationic 5-10 membered heteroaryl group which is optionally substituted by 1, 2, 3, or 4 independently selected $C_{1-6}$ alkyl groups. In some embodiments, A comprises one or more cationic groups which are each independently selected from the group consisting of trimethylammonium and N—($C_{1-6}$ alkyl)indolium, wherein the N—($C_{1-6}$ alkyl)indolium is optionally substituted by 1 or 2 independently selected $C_{1-6}$ alkyl groups.

In some embodiments, A comprises 1, 2, 3, or 4 cationic groups each independently selected from the group consisting of ammonium, $C_{1-6}$ alkylammonium, di($C_{1-6}$ alkyl)ammonium, tri($C_{1-6}$ alkyl)ammonium, a cationic 5-10 membered heteroaryl group, and a cationic 4-10 membered heterocycloalkyl group, wherein the cationic 5-10 membered heteroaryl group and cationic 4-10 membered heterocycloalkyl group are each optionally substituted by 1, 2, 3, or 4 independently selected $C_{1-6}$ alkyl groups.

In some embodiments, A comprises 1, 2, 3, or 4 cationic groups which are each independently selected from the group consisting of tri($C_{1-6}$ alkyl)ammonium and a cationic 5-10 membered heteroaryl group which is optionally substituted by 1, 2, 3, or 4 independently selected $C_{1-6}$ alkyl groups.

In some embodiments, A comprises 1, 2, 3, or 4 cationic groups which are each independently selected from the group consisting of trimethylammonium and N—($C_{1-6}$ alkyl)indolium, wherein the N—(C$_{1-6}$ alkyl)indolium is optionally substituted by 1 or 2 independently selected C$_{1-6}$ alkyl groups.

In some embodiments, A comprises one or more anionic groups each independently selected from the group consisting of oxide, carbonate, carboxylate, phosphate, sulfide, sulfinate, and sulfonate. In some embodiments, A comprises one or more anionic groups which are each sulfonate.

In some embodiments, A comprises 1, 2, 3, or 4 anionic groups each independently selected from the group consisting of oxide, carbonate, carboxylate, phosphate, sulfide, sulfinate, and sulfonate. In some embodiments, A comprises 1 or 2 anionic groups each independently selected from the group consisting of oxide, carbonate, carboxylate, phosphate, sulfide, sulfinate, and sulfonate.

In some embodiments, A comprises 1, 2, 3, or 4 anionic groups which are each sulfonate. In some embodiments, A comprises 1 or 2 anionic groups which are each sulfonate.

In some embodiments, A is selected from the group consisting of formulas A-1, A-2, A-3, A-4, A-5, and A-6:

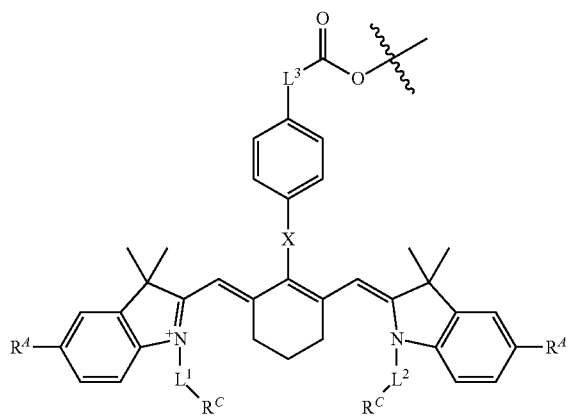

A-1

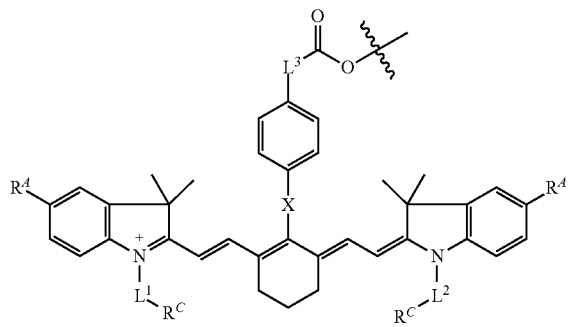

A-2

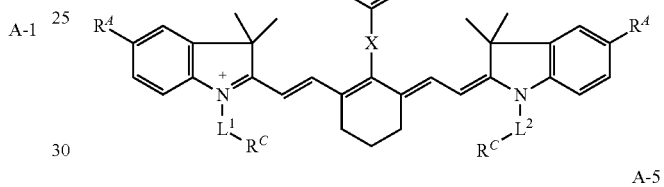

A-3

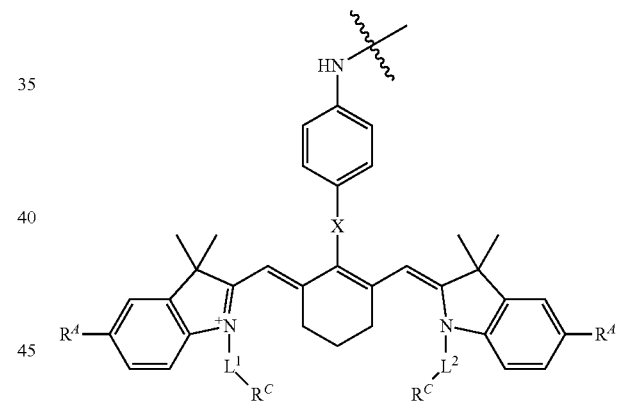

A-4

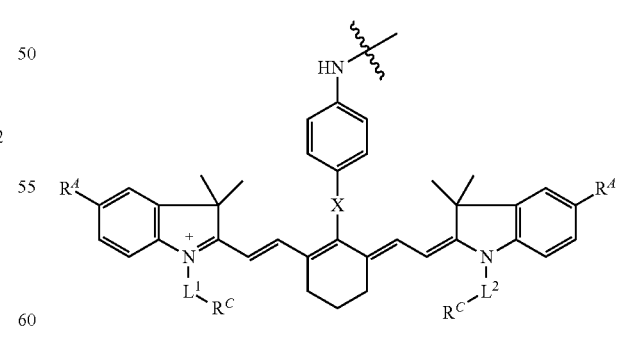

A-5

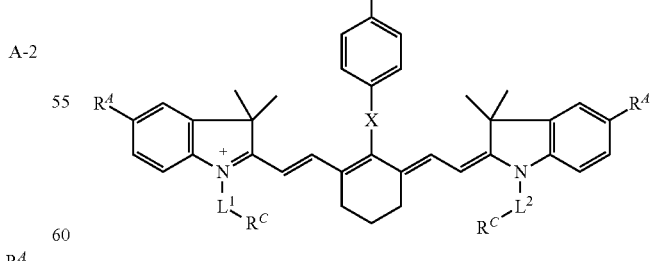

A-6 wherein:
  ～ indicates the bond between A and B;
  X is selected from the group consisting of a bond, CH$_2$, NH, —NH—C$_{1-6}$ alkylene-, O, and S;
  each R$^A$ is an independently selected anionic group;
  each R$^C$ is an independently selected cationic group; and $L^1$, $L^2$, and $L^3$ are each an independently selected $C_{1-6}$ alkylene group.

In some embodiments, A is selected from the group consisting of formulas A-1 and A-2:

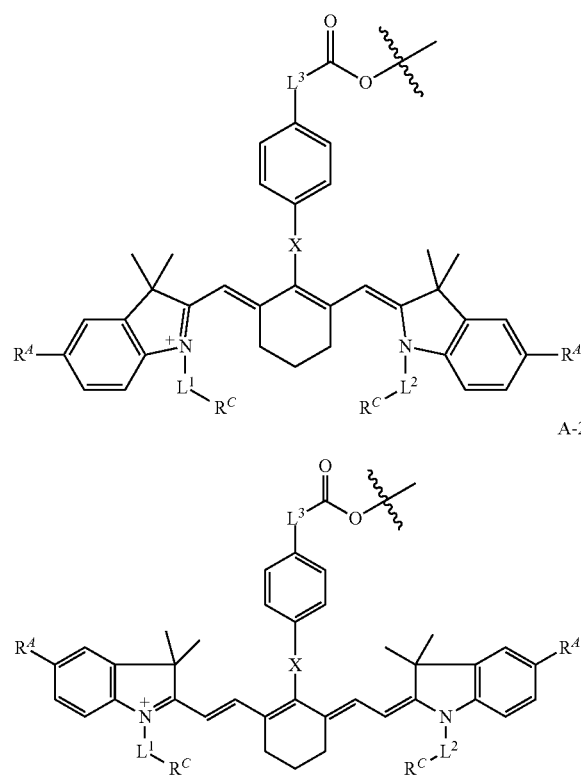

wherein

∿∿∿ indicates the bond between A and B;

X is selected from the group consisting of a bond, C, $CH_2$, NH, O and S;

each $R^A$ is an independently selected anionic group;

each $R^C$ is an independently selected cationic group; and $L^1$, $L^2$, and $L^3$ are each an independently selected $C_{1-6}$ alkylene group In some embodiments, each $R^C$ is independently selected from the group consisting of ammonium, $C_{1-6}$ alkylammonium, di($C_{1-6}$ alkyl)ammonium, and tri($C_{1-6}$ alkyl)ammonium. In some embodiments, each $R^C$ is an independently selected tri($C_{1-6}$ alkyl)ammonium group. In some embodiments, each $R^C$ is trimethylammonium.

In some embodiments, each $R^A$ is independently selected from the group consisting of oxide, carbonate, carboxylate, phosphate, sulfide, sulfinate, and sulfonate. In some embodiments, each $R^A$ is sulfonate.

In some embodiments, $L^1$ is a $C_{1-3}$ alkylene group. In some embodiments, $L^1$ is propylene.

In some embodiments, $L^2$ is a $C_{1-3}$ alkylene group. In some embodiments, $L^2$ is propylene.

In some embodiments, $L^1$ and $L^2$ are each an independently selected $C_{1-3}$ alkylene group. In some embodiments, $L^1$ and $L^2$ are the same. In some embodiments, $L^1$ and $L^2$ are different. In some embodiments, L and $L^2$ are each propylene.

In-some embodiments, $L^3$ is a $C_{1-3}$ alkylene group. In some embodiments, $L^3$ is ethylene.

In some embodiments, X is a bond. In some embodiments, X is selected from the group consisting of C, $CH_2$, NH, —NH—$C_{1-6}$ alkylene-, O, and S. In some embodiments, X is $CH_2$. In some embodiments, X is selected from the group consisting of NH, —NH—$C_{1-6}$ alkylene-, O, and S.

In some embodiments, A is selected from the group consisting of:

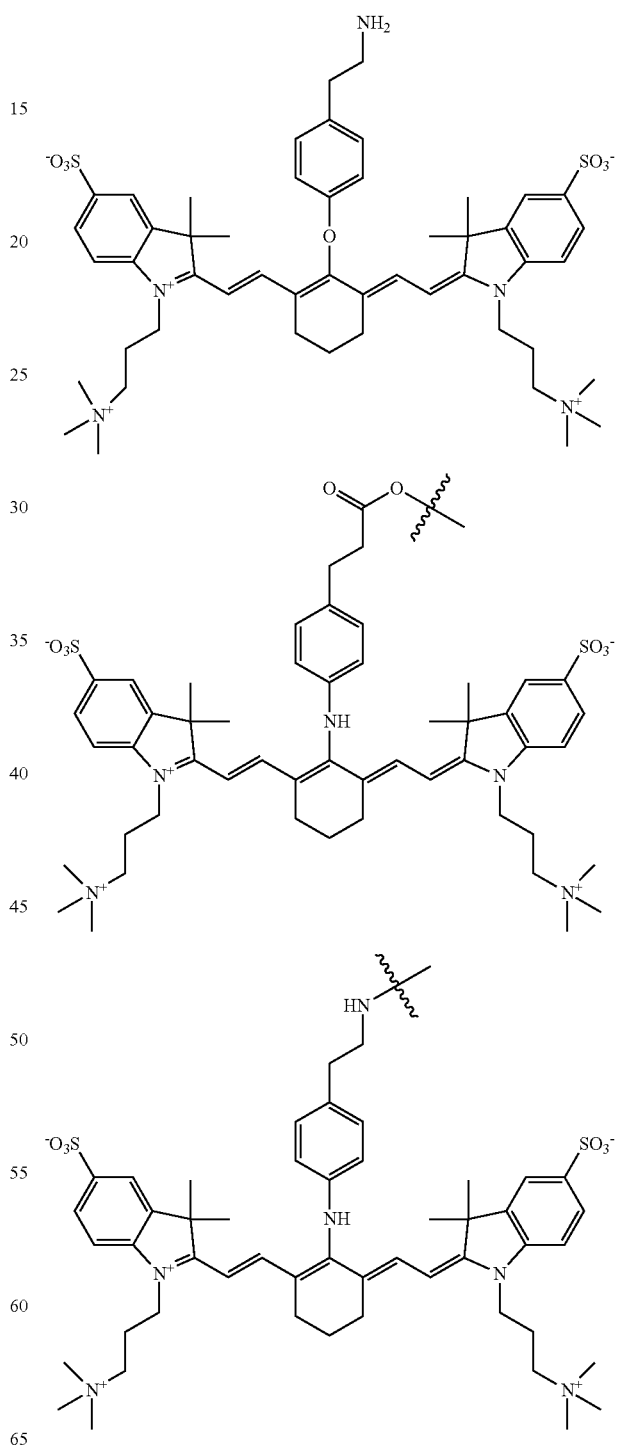

-continued

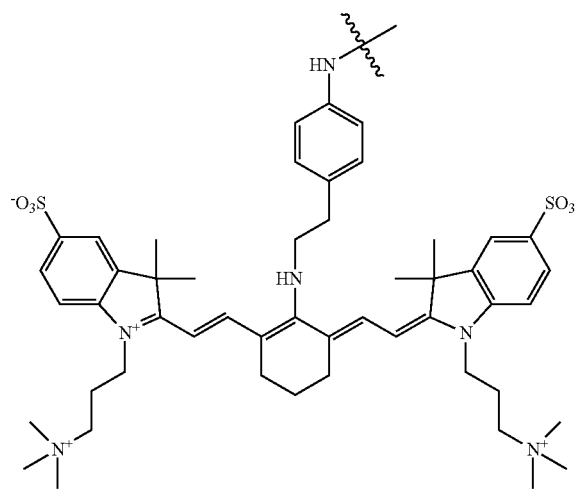

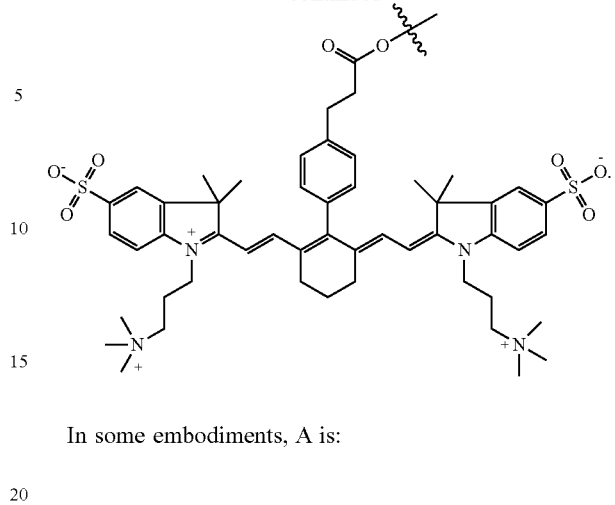

In some embodiments, A is:

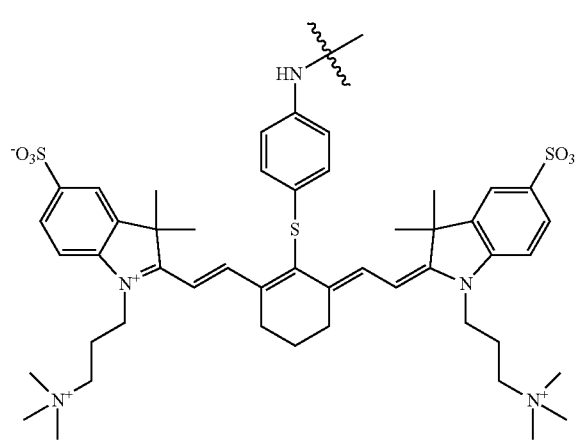

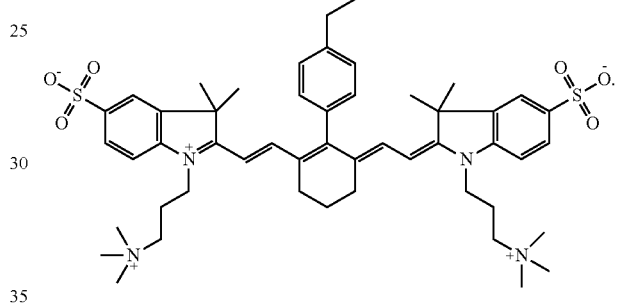

In some embodiments, B is selected from the group consisting of a biocompatible polypeptide and a biocompatible polyester, each of which are substituted by one or more C groups and one or more -D-E groups.

In some embodiments, B is selected from the group consisting of polylysine, polylactic acid, poly(lactic-co-glycolic acid), polyaspartic acid, polyglutamic acid, and polyglutamic acid-poly(ethylene glycol) copolymer, each of which are substituted by one or more C groups and one or more -D-E groups. In some embodiments, B is polylysine substituted by one or more C groups and one or more -D-E groups. In some embodiments, the polylysine is ε-poly-L-lysine substituted by one or more C groups and one or more -D-E groups.

In some embodiments, B is:

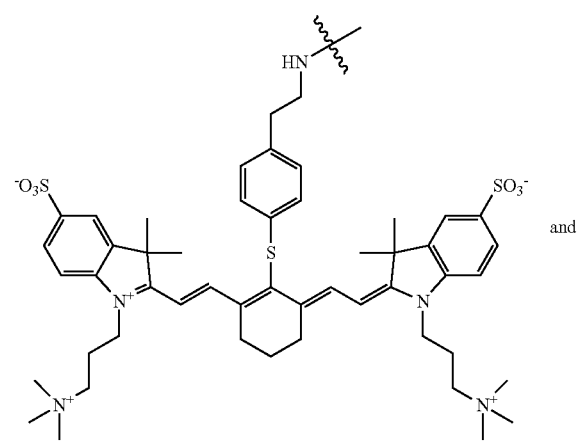

and

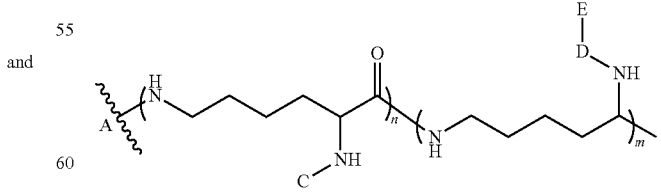

wherein:

$\sim\!\!\!\sim\!\!\!\sim^{A}$ indicates the bond between B and A; and
n is an integer from 2 to 50; and
m is an integer from 1 to 20.

In some embodiments, n is an integer from 2 to 30, for example, 2 to 30, 2 to 20, 2 to 10, 2 to 5, 5 to 30, 5 to 20, 5 to 10, 10 to 30, 10 to 20, or 20 to 30.

In some embodiments, m is an integer from 1 to 10, for example, 1 to 10, 1 to 5, 1 to 3, 3 to 10, 3 to 5, or 5 to 10.

In some embodiments, n is an integer from 5 to 30 and m is an integer from 1 to 10.

In some embodiments, the hydrodynamic radius of B is from about 1 nm to about 10 nm, for example, about 1 nm to about 10 nm, about 1 nm to about 8 nm, about 1 nm to about 6 nm, about 1 nm to about 4 nm, about 1 nm to about 2 nm, about 2 nm to about 10 nm, about 2 nm to about 8 nm, about 2 nm to about 6 nm, about 2 nm to about 4 nm, about 4 nm to about 10 nm, about 4 nm to about 8 nm, about 4 nm to about 6 nm, about 6 nm to about 10 nm, about 6 nm to about 8 nm, or about 8 nm to about 10 nm.

In some embodiments, each C is independently selected from the group consisting of hydrogen and an anionic group comprising one or more alkylene groups, one or more carbonyl groups, and one or more carboxyl groups.

In some embodiments, C is an anionic group of the following formula:

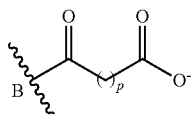

wherein:

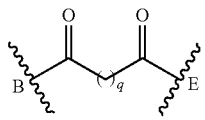 indicates the bond between C and B;

p is an integer from 1 to 10.

In some embodiments,

In some embodiments, p is an integer from 1 to 5, for example, 1 to 5, 1 to 4, 1 to 3, 1 to 2, 2 to 5, 2 to 4, 2 to 3, 3 to 5, 3 to 4, or 4 to 5.

In some embodiments, D is a linking group comprising one or more alkylene groups, one or more carbonyl groups, and one or more carboxyl groups.

In some embodiments, D is a linking group of the following formula:

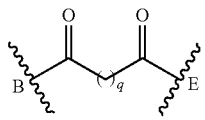

wherein:

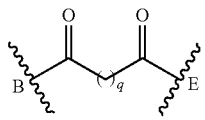 indicates the bond between D and B;

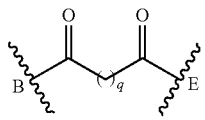 indicates the bond between D and E; and q is an integer from 1 to 10.

In some embodiments, q is an integer from 1 to 5, for example, 1 to 5, 1 to 4, 1 to 3, 1 to 2, 2 to 5, 2 to 4, 2 to 3, 3 to 5, 3 to 4, or 4 to 5.

In some embodiments, A is a group of formula A-1 or A-2:

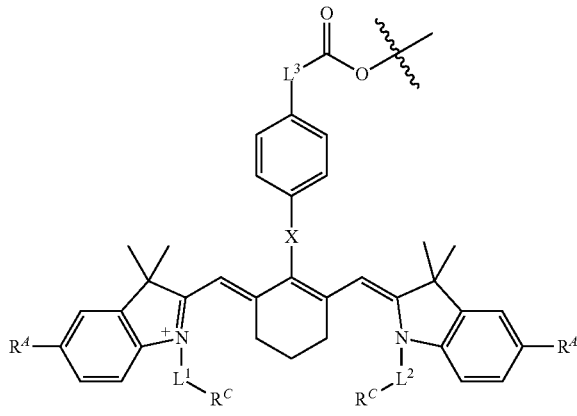

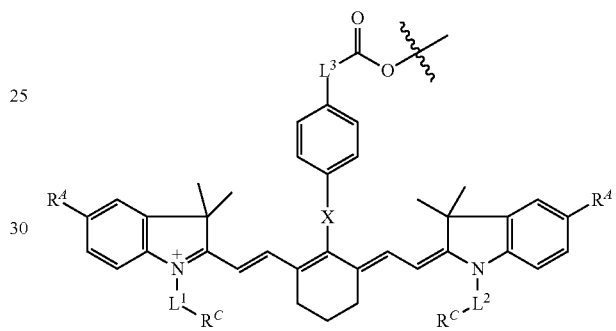

wherein:

$\sim\!\sim\!\sim$ indicates the bond between A and B;

each $R^A$ is an independently selected anionic group;

each $R^C$ is an independently selected cationic group; and $L^1$, $L^2$, and $L^3$ are each an independently selected $C_{1-6}$ alkylene group;

B is selected from the group consisting of a biocompatible polypeptide and a biocompatible polyester, each of which are substituted by one or more C groups and one or more -D-E groups;

C is an anionic group of the following formula:

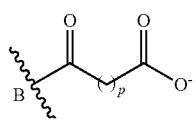

wherein:

$\sim\!\sim\!\sim$ indicates the bond between C and B;

p is an integer from 1 to 10;

D is a linking group of the following formula:

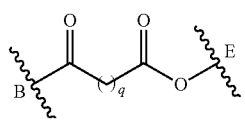

wherein:

$\overset{B}{\sim}$ indicates the bond between D and B;

$\overset{E}{\sim}$ indicates the bond between D and E; and q is an integer from 1 to 10; and E is a metal chelating group.

In some embodiments:

A is a group of the following formula:

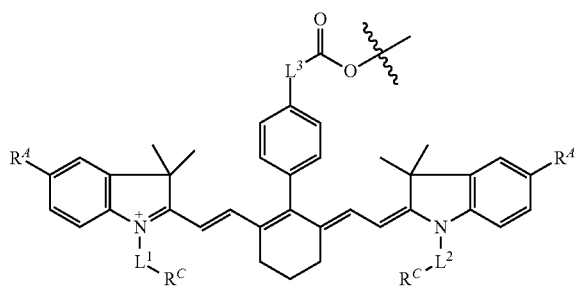

wherein:

$\sim$ indicates the bond between A and B;

each $R^A$ is independently selected from the group consisting of oxide, carbonate, carboxylate, phosphate, sulfide, sulfinate, and sulfonate;

each $R^C$ is independently selected from the group consisting of ammonium, $C_{1-6}$ alkylammonium, di($C_{1-6}$ alkyl)ammonium, and tri($C_{1-6}$ alkyl)ammonium; and $L^1$, $L^2$, and $L^3$ are each an independently selected $C_{1-6}$ alkylene group;

B is selected from the group consisting of polylysine, polylactic acid, and poly(lactic-co-glycolic acid), polyaspartic acid, polyglutamic acid, and polyglutamic acid-poly(ethylene glycol) copolymer, each of which are substituted by one or more C groups and one or more -D-E groups;

C is an anionic group of the following formula:

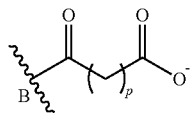

wherein:

$\overset{B}{\sim}$ indicates the bond between C and B;

p is an integer from 1 to 10;

D is a linking group of the following formula:

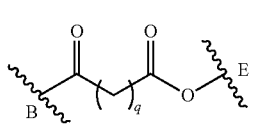

wherein:

$\overset{B}{\sim}$ indicates the bond between D and B;

$\overset{E}{\sim}$ indicates the bond between D and E; and q is an integer from 1 to 10; and E is a metal chelating group.

In some embodiments:

A is a group of the following formula:

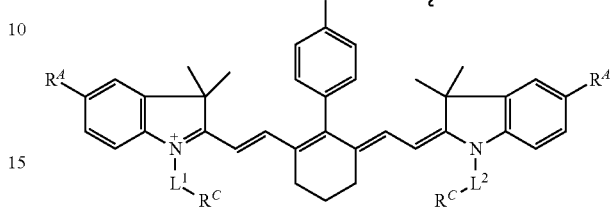

A-2 wherein:

$\sim$ indicates the bond between A and B;

each $R^A$ is sulfonate;

each $R^C$ is tri($C_{1-6}$ alkyl)ammonium; and $L^1$, $L^2$, and $L^3$ are each an independently selected $C_{1-6}$ alkylene group;

B is polylysine which is substituted by one or more C groups and one or more -D-E groups;

C is an anionic group of the following formula:

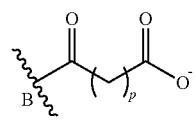

wherein:

$\overset{B}{\sim}$ indicates the bond between C and B;

p is an integer from 1 to 5;

D is a linking group of the following formula:

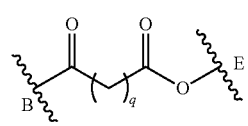

wherein:

$\overset{B}{\sim}$ indicates the bond between D and B;

$\overset{E}{\sim}$ indicates the bond between D and E; and q is an integer from 1 to 5; and E is a metal chelating group.

In some embodiments, E is selected from the group consisting of an iron chelating group, a lead chelating group, and a copper chelating group. In some embodiments, E is an iron chelating group.

In some embodiments, E is selected from the group consisting of an iron chelating group, a lead chelating group, a copper chelating group, an arsenic chelating group, a mercury chelating group, a manganese chelating group, a cadmium chelating group, a nickel chelating group, a chromium chelating group, a gold chelating group, and an antimony chelating group.

Example metal chelating groups include, but are not limited to, deferoxamine, deferasirox and deferiprone (e.g., for chelating iron), D-penicillamine (e.g., for chelating copper), dimercaprol, (e.g., for chelating arsenic, mercury, lead, cadmium, nickel, chromium, gold, and/or antimony), dimercaptosuccinic acid (DMSA) (e.g., for chelating arsenic mercury, and/or lead), Calcium disodium EDTA (e.g., for chelating mercury and/or lead), and p-aminosalicyclic acid (e.g., for chelating manganese).

In some embodiments, E is selected from the group consisting of an iron chelating group, a lead chelating group, a copper chelating group, an arsenic chelating group, a mercury chelating group, and a manganese chelating group. In some embodiments, E is an iron chelating group.

In some embodiments, E is selected from the group consisting of dimercaptosuccinic acid, dimercaprol, ethylenediaminetetraacetic acid, p-aminosalicyclic acid, D-penicillamine, deferoxamine, deferiprone, and deferasirox. In some embodiments, E is deferoxamine.

In some embodiments, the compound of Formula I is:

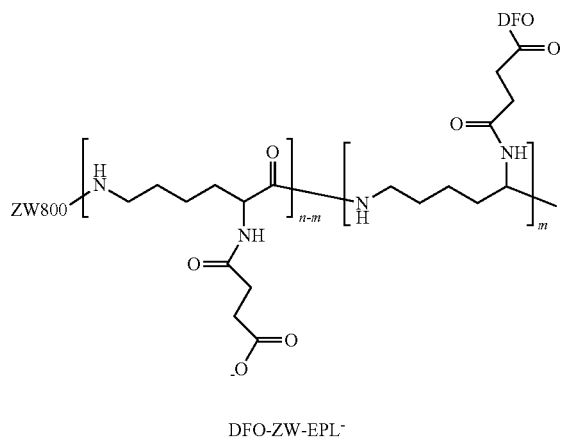

DFO-ZW-EPL⁻ or a pharmaceutically acceptable salt thereof, wherein groups n, m, ZW800, and DFO are defined according to the definitions provided herein.

Synthesis

The present application further provides methods of preparing the compounds provided herein and salts thereof. For example, the compounds provided herein (e.g., compounds of Formula I) and salts thereof, can be prepared according to the procedure shown below in Scheme 1.

Scheme 1.

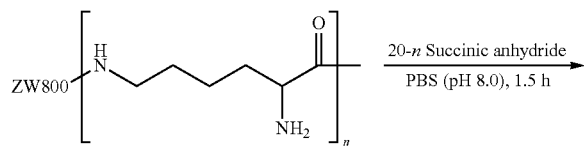

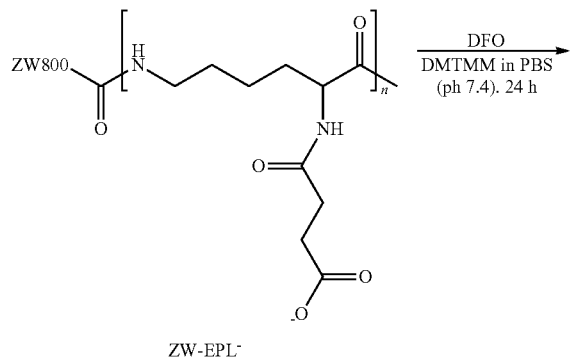

ZW-EPL⁻

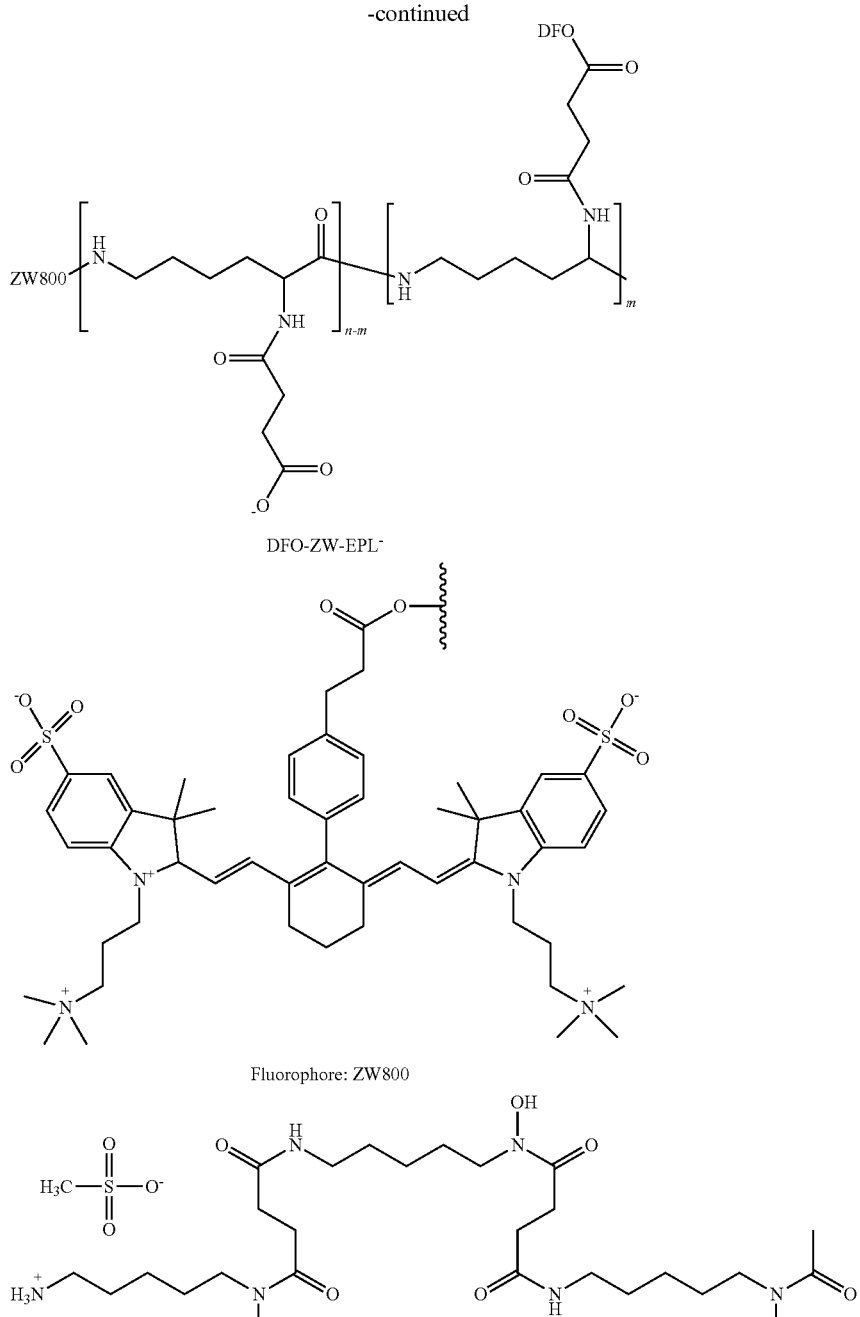

Fluorophore: ZW800

Ligand: Deferrioxamne (DFO) mesylate salt

Coupling agent: DMTMM: 4-(4,6-dimethoxy-1,3,5-triazin-2-yl)-4-methylmorpholinium chloride It will be appreciated by one skilled in the art that the processes described are not the exclusive means by which compounds provided herein may be synthesized and that a broad repertoire of synthetic organic reactions is available to be potentially employed in synthesizing compounds provided herein. The person skilled in the art knows how to select and implement appropriate synthetic routes. Suitable synthetic methods of starting materials, intermediates and products may be identified by reference to the literature, including reference sources such as: *Advances in Heterocyclic Chemistry*, Vols. 1-107 (Elsevier, 1963-2012); *Journal of Heterocyclic Chemistry* Vols. 1-49 (*Journal of Heterocyclic Chemistry*, 1964-2012); Carreira, et al. (Ed.) *Science of Synthesis, Vols.* 1-48 (2001-2010) and Knowledge Updates KU2010/1-4; 2011/1-4; 2012/1-2 (Thieme, 2001-2012); Katritzky, et al. (Ed.) *Comprehensive Organic Functional Group Transformations*, (Pergamon Press, 1996); Katritzky et al. (Ed.); *Comprehensive Organic Functional Group Transformations II* (Elsevier, 2d Edition, 2004); Katritzky et al. (Ed.), *Comprehensive Heterocyclic Chemistry* (Pergamon Press, 1984); Katritzky et al., *Comprehensive Heterocyclic Chemistry II*, (Pergamon Press, 1996); Smith et al., *March's*

*Advanced Organic Chemistry*: Reactions, Mechanisms, and Structure, 6$^{th}$ Ed. (Wiley, 2007); Trost et al. (Ed.), *Comprehensive Organic Synthesis* (Pergamon Press, 1991).

Preparation of compounds described herein can involve the protection and deprotection of various chemical groups. The need for protection and deprotection, and the selection of appropriate protecting groups, can be readily determined by one skilled in the art. The chemistry of protecting groups can be found, for example, in T. W. Greene and P. G. M. Wuts, *Protective Groups in Organic Synthesis*, 3$^{rd}$ Ed., Wiley & Sons, Inc., New York (1999).

Reactions can be monitored according to any suitable method known in the art. For example, product formation can be monitored by spectroscopic means, such as nuclear magnetic resonance spectroscopy (e.g., $^1$H or $^{13}$C), infrared spectroscopy, spectrophotometry (e.g., UV-visible), mass spectrometry, or by chromatographic methods such as high performance liquid chromatography (HPLC), liquid chromatography-mass spectroscopy (LCMS), or thin layer chromatography (TLC). Compounds can be purified by those skilled in the art by a variety of methods, including high performance liquid chromatography (HPLC) and normal phase silica chromatography.

At various places in the present specification, divalent linking substituents are described. It is specifically intended that each divalent linking substituent include both the forward and backward forms of the linking substituent. For example, —NR(CR'R")$_n$—includes both —NR(CR'R")$_n$— and —(CR'R")$_n$NR—. Where the structure clearly requires a linking group, the Markush variables listed for that group are understood to be linking groups.

As used herein, the phrase "optionally substituted" means unsubstituted or substituted. As used herein, the term "substituted" means that a hydrogen atom is removed and replaced by a substituent. It is to be understood that substitution at a given atom is limited by valency.

Throughout the definitions, the term "$C_{n-m}$" indicates a range which includes the endpoints, wherein n and m are integers and indicate the number of carbons. Examples include $C_{1-4}$, $C_{1-6}$, and the like.

As used herein, the term "$C_{n-m}$ alkyl" refers to a saturated hydrocarbon group that may be straight-chain or branched, having n to m carbons. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2,2-trimethylpropyl, and the like. In some embodiments, the alkyl group contains from 1 to 6 carbon atoms, from 1 to 4 carbon atoms, from 1 to 3 carbon atoms, or 1 to 2 carbon atoms.

As used herein, the term "$C_{n-m}$ alkylene", employed alone or in combination with other terms, refers to a divalent alkyl linking group having n to m carbons. Examples of alkylene groups include, but are not limited to, ethan-1,1-diyl, ethan-1,2-diyl, propan-1,1,-diyl, propan-1,3-diyl, propan-1,2-diyl, butan-1,4-diyl, butan-1,3-diyl, butan-1,2-diyl, 2-methyl-propan-1,3-diyl, and the like. In some embodiments, the alkylene moiety contains 2 to 6, 2 to 4, 2 to 3, 1 to 6, 1 to 4, or 1 to 2 carbon atoms.

As used herein, the term "ammonium" refers to a group of formula —NH$_3^+$.

As used herein, the term "$C_{n-m}$ alkylammonium" refers to a group of formula —[NH$_2$($C_{n-m}$ alkyl)]*, wherein the $C_{n-m}$ alkyl refers to a saturated hydrocarbon group that may be straight-chain or branched, having n to m carbons, as defined herein.

As used herein, the term "di($C_{n-m}$ alkyl)ammonium" refers to a group of formula —[NH($C_{n-m}$ alkyl)$_2$]*, wherein the each $C_{n-m}$ alkyl refers to an independently selected saturated hydrocarbon group that may be straight-chain or branched, having n to m carbons, as defined herein.

As used herein, the term "tri($C_{n-m}$ alkyl)ammonium" refers to a group of formula —[N($C_{n-m}$ alkyl)$_3$]*, wherein the each $C_{n-m}$ alkyl refers to an independently selected saturated hydrocarbon group that may be straight-chain or branched, having n to m carbons, as defined herein.

As used herein, the term "carboxylate" refers to a group of formula "—COO$^-$".

As used herein, the term "carbonate" refers to a group of formula "—CO$_3^{2-}$".

As used herein, the term "heteroaryl" refers to a monocyclic aromatic heterocycle having at least one heteroatom ring member selected from sulfur, oxygen, and nitrogen. In some embodiments, the heteroaryl ring has 1, 2, 3, or 4 heteroatom ring members independently selected from nitrogen, sulfur and oxygen. In some embodiments, the heteroaryl ring has 1, 2, 3, or 4 heteroatom ring members independently selected from nitrogen and sulfur. In some embodiments, any ring-forming N in a heteroaryl moiety can form an N-oxide. In some embodiments, the heteroaryl has 5-6 ring atoms and 1, 2, 3, or 4 heteroatom ring members independently selected from nitrogen, sulfur and oxygen. In some embodiments, the heteroaryl has 5-6 ring atoms and 1, 2, 3, or 4 heteroatom ring members independently selected from nitrogen and sulfur. In some embodiments, the heteroaryl has 5-6 ring atoms and 1 or 2 heteroatom ring members independently selected from nitrogen and sulfur. Exemplary five-membered ring heteroaryl groups include, but are not limited to, thienyl, furyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4-oxadiazolyl. Exemplary six-membered ring heteroaryl groups include, but are not limited to, pyridyl, pyrazinyl, pyrimidinyl, triazinyl and pyridazinyl.

It is understood that a cationic heteroaryl group refers to a heteroaryl group as defined herein having one or more positive charges. Exemplary cationic heteroaryl groups include, but are not limited to, pyridium, pyrazinium, pyrimidinium, triazinium, and indolium.

As used herein, "heterocycloalkyl" refers to non-aromatic monocyclic or polycyclic heterocycles having one or more ring-forming heteroatoms selected from O, N, or S. Included in heterocycloalkyl are monocyclic 4-, 5-, 6-, and 7-membered heterocycloalkyl groups. Heterocycloalkyl groups can also include spirocycles. Example heterocycloalkyl groups include pyrrolidin-2-one, 1,3-isoxazolidin-2-one, pyranyl, tetrahydropuran, oxetanyl, azetidinyl, morpholino, thiomorpholino, piperazinyl, tetrahydrofuranyl, tetrahydrothienyl, piperidinyl, pyrrolidinyl, isoxazolidinyl, isothiazolidinyl, pyrazolidinyl, oxazolidinyl, thiazolidinyl, imidazolidinyl, azepanyl, benzazapene, and the like. Ring-forming carbon atoms and heteroatoms of aheterocycloalkyl group can be optionally substituted by oxo or sulfido (e.g., C(O), S(O), C(S), or S(O)2, etc.). The heterocycloalkyl group can be attached through a ring-forming carbon atom or a ring-forming heteroatom. In some embodiments, the heterocycloalkyl group contains 0 to 3 double bonds. In some embodiments, the heterocycloalkyl group contains 0 to 2 double bonds. Also included in the definition of heterocycloalkyl are moieties that have one or more aromatic rings fused (i.e., having a bond in common with) to the cycloalkyl ring, for example, benzo or thienyl derivatives of piperidine, morpholine, azepine, etc. A heterocycloalkyl group containing a fused aromatic ring can be attached through any ring-forming atom including a ring-forming atom of the fused aromatic ring. In some embodiments, the heterocycloalkyl has 4-10, 4-7 or 4-6 ring atoms with 1 or 2 heteroatoms independently selected from nitrogen, oxygen, or sulfur and having one or more oxidized ring members.

It is understood that a cationic heterocycloalkyl group refers to a heterocycloalkyl group as defined herein having one or more positive charges. Exemplary cationic heterocycloalkyl groups include, but are not limited to, oxetanium, azetidinium, morpholinium, and thiomorpholinium.

At certain places, the definitions or embodiments refer to specific rings (e.g., an azetidine ring, a pyridine ring, etc.). Unless otherwise indicated, these rings can be attached to any ring member provided that the valency of the atom is not exceeded. For example, an azetidine ring may be attached at any position of the ring, whereas a pyridin-3-yl ring is attached at the 3-position.

As used herein, the term "oxide" refers to a group of formula "—O$^-$".

As used herein, the term "phosphate" refers to a group of formula "—PO$_4^{3-}$".

As used herein, the term "sulfide" refers to a group of formula "—S$^-$".

As used herein, the term "sulfinate" refers to a group of formula "—SO$_2{}^-$".

As used herein, the term "sulfonate" refers to a group of formula "—SO$_3{}^-$".

As used herein, the term "zwitterion" refers to a group comprising one or more positively charged groups (e.g., ammonium, $C_{1-6}$ alkylammonium, di($C_{1-6}$ alkyl)ammonium, tri($C_{1-6}$ alkyl)ammonium, and the like) and one or more negatively charged groups (e.g., sulfinate, sulfonate, phosphate, oxide, and the like).

As used herein, the term "metal ions" refers to free metal ions or metal ions bound to low affinity ligands (e.g., citrate), or a combination thereof, in a sample (e.g., a cell sample or tissue sample) or a subject.

The term "compound" as used herein is meant to include all stereoisomers, geometric isomers, tautomers, and isotopes of the structures depicted. Compounds herein identified by name or structure as one particular tautomeric form are intended to include other tautomeric forms unless otherwise specified.

Compounds provided herein also include tautomeric forms. Tautomeric forms result from the swapping of a single bond with an adjacent double bond together with the concomitant migration of a proton. Tautomeric forms include prototropic tautomers which are isomeric protonation states having the same empirical formula and total charge. Example prototropic tautomers include ketone—enol pairs, amide—imidic acid pairs, lactam—lactim pairs, enamine—imine pairs, and annular forms where a proton can occupy two or more positions of a heterocyclic system, for example, 1H- and 3H-imidazole, 1H-, 2H- and 4H-1,2,4-triazole, 1H- and 2H-isoindole, and 1H- and 2H-pyrazole. Tautomeric forms can be in equilibrium or sterically locked into one form by appropriate substitution.

All compounds, and pharmaceutically acceptable salts thereof, can be found together with other substances such as water and solvents (e.g. hydrates and solvates) or can be isolated.

In some embodiments, preparation of compounds can involve the addition of acids or bases to affect, for example, catalysis of a desired reaction or formation of salt forms such as acid addition salts.

Example acids can be inorganic or organic acids and include, but are not limited to, strong and weak acids. Some example acids include hydrochloric acid, hydrobromic acid, sulfuric acid, phosphoric acid, p-toluenesulfonic acid, 4-nitrobenzoic acid, methanesulfonic acid, benzenesulfonic acid, trifluoroacetic acid, and nitric acid. Some weak acids include, but are not limited to acetic acid, propionic acid, butanoic acid, benzoic acid, tartaric acid, pentanoic acid, hexanoic acid, heptanoic acid, octanoic acid, nonanoic acid, and decanoic acid.

Example bases include lithium hydroxide, sodium hydroxide, potassium hydroxide, lithium carbonate, sodium carbonate, potassium carbonate, and sodium bicarbonate. Some example strong bases include, but are not limited to, hydroxide, alkoxides, metal amides, metal hydrides, metal dialkylamides and arylamines, wherein; alkoxides include lithium, sodium and potassium salts of methyl, ethyl and t-butyl oxides; metal amides include sodium amide, potassium amide and lithium amide; metal hydrides include sodium hydride, potassium hydride and lithium hydride; and metal dialkylamides include lithium, sodium, and potassium salts of methyl, ethyl, n-propyl, iso-propyl, n-butyl, tert-butyl, trimethylsilyl and cyclohexyl substituted amides.

In some embodiments, the compounds and salts provided herein are substantially isolated. By "substantially isolated" is meant that the compound is at least partially or substantially separated from the environment in which it was formed or detected. Partial separation can include, for example, a composition enriched in the compounds provided herein. Substantial separation can include compositions containing at least about 50%, at least about 60%, at least about 70%, at least about 80%, at least about 90%, at least about 95%, at least about 97%, or at least about 99% by weight of the compounds provided herein, or salt thereof. Methods for isolating compounds and their salts are routine in the art.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The present application also includes pharmaceutically acceptable salts of the compounds described herein. As used herein, "pharmaceutically acceptable salts" refers to derivatives of the disclosed compounds wherein the parent compound is modified by converting an existing acid or base moiety to its salt form. Examples of pharmaceutically acceptable salts include, but are not limited to, mineral or organic acid salts of basic residues such as amines; alkali or organic salts of acidic residues such as carboxylic acids; and the like. The pharmaceutically acceptable salts of the present application include the conventional non-toxic salts of the parent compound formed, for example, from non-toxic inorganic or organic acids. The pharmaceutically acceptable salts of the present application can be synthesized from the parent compound which contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two; generally, non-aqueous media like ether, ethyl acetate, alcohols (e.g., methanol, ethanol, iso-propanol, or butanol) or acetonitrile (MeCN) are preferred. Lists of suitable salts are found in *Remington's Pharmaceutical Sciences*, 17th ed., Mack Publishing Company, Easton, Pa., 1985, p. 1418 and *Journal of Pharmaceutical Science*, 66, 2 (1977). Conventional methods for preparing salt forms are described, for example, in *Handbook of Pharmaceutical Salts: Properties, Selection, and Use*, Wiley-VCH, 2002.

Methods of Use

The present application further provides methods of chelating metal ions in a sample (e.g. a cell sample or a tissue sample) or a subject, comprising contacting the sample with, or administering to the subject, a compound provided herein or (e.g., a compound of Formula I) or a pharmaceutically acceptable salt thereof.

As used herein, the term "subject," refers to any animal, including mammals. Example subjects include, but are not limited to, mice, rats, rabbits, dogs, cats, swine, cattle, sheep, horses, primates, and humans. In some embodiments, the subject is a human. In some embodiments, the method comprises administering to the subject a therapeutically effective amount of a compound provided herein (e.g., a compound of any of Formula I), or a pharmaceutically acceptable salt thereof.

In some embodiments, the method is a method of chelating metal ions in a cell or tissue sample, comprising contacting the cell sample or tissue sample with a compound provided herein, or a pharmaceutically acceptable salt thereof. In some embodiments, the contacting forms a metal-compound chelate.

The present application further provides a method of reducing the amount of free metal ions in a cell or tissue sample, comprising contacting the cell or tissue sample with a compound provided herein, or a pharmaceutically acceptable salt thereof. In some embodiments, the contacting forms a metal-compound chelate, thereby reducing the amount of free metal ions in the cell or tissue sample.

The present application further provides a method of chelating metal ions in a subject, comprising administering to the subject a therapeutically effective amount of a compound provided herein, or a pharmaceutically acceptable salt thereof. In some embodiments, the metal ions are free metal ions or metal ions bound to low affinity ligands (e.g., citrate).

The present application further provides a method of reducing the amount of free metal ions in a subject, comprising administering to the subject a compound provided herein, or a pharmaceutically acceptable salt thereof.

The present application further provides a method of reducing the amount of metal ions (e.g., free metal ions or metal ions bound to low affinity ligands (e.g., citrate)), in the bloodstream of a subject in need thereof. In some embodiments, the method is a method of reducing the amount iron ions (e.g., free iron irons or iron ions bound to low affinity ligands (e.g., citrate)) in the bloodstream of a subject in need thereof. In some embodiments, the subject has been determined to have high levels of iron ions (e.g., free iron irons or iron ions bound to low affinity ligands (e.g., citrate)) in the bloodstream compared to a subject having normal levels of iron ions in the bloodstream.

The present application further provides a method of reducing iron in a subject in need thereof, comprising administering to the subject a compound provided herein, or a pharmaceutically acceptable salt thereof. In some embodiments, the method is a method of reducing iron overload in a subject in need thereof.

The present application further provides a method of reducing the amount of metal ions bound to low affinity ligands in a subject, comprising administering to the subject a compound provided herein, or a pharmaceutically acceptable salt thereof.

The present application further provides a method of reducing the amount of metal ions in a subject, comprising:

i) diagnosing the subject as having an abnormal level of metal ions; and ii) administering to the subject a therapeutically effective amount of a compound provided herein, or a pharmaceutically acceptable salt thereof. In some embodiments, the metal ions are free metal ions or metal ions bound to low affinity ligands (e.g., citrate).

The present application further provides a method of reducing the amount of free metal ions in a subject, comprising:

i) diagnosing the subject as having an abnormal level of free metal ions; and ii) administering to the subject a therapeutically effective amount of a compound provided herein, or a pharmaceutically acceptable salt thereof.

The present application further provides a method of treating a disease associated with an abnormal amount of metal ions in a subject. In some embodiments, the disease is associated with an abnormal amount of free metal ions, an abnormal amount of metal ions bound to low affinity ligands (e.g., citrate), or a combination thereof. In some embodiments, the method comprises administering to the subject a compound provided herein, or a pharmaceutically acceptable salt thereof.

In some embodiments, the disease is associated with an abnormally high amount of metal ions in the subject (e.g., free metal ions, metal ions bound to low affinity ligands, or a combination thereof) compared to a subject having normal levels of metal ions. In some embodiments, the disease is associated with an abnormally high amount of free metal ions in the subject, compared to a subject having normal levels of free metal ions. In some embodiments, the disease is associated with an abnormally high amount of metal ions bound to low affinity ligands in the subject, compared to a subject having normal levels of metal ions bound to low affinity ligands in the subject. In some embodiments, the disease is associated with an abnormally high amount of a combination of free metal ions and metal ions bound to low affinity ligands in the subject, compared to a subject having normal levels of free metal ions and metal ions bound to low affinity ligands.

In some embodiments, the abnormal amount of metal ions in the subject refers to about 5% to about 100% increased concentration of metal ions in the subject compared to the concentration of metal ions in a normal subject, for example, about 5% to about 100%, about 5% to about 75%, about 5% to about 50%, about 5% to about 25%, about 5% to about 10%, about 10% to about 100%, about 10% to about 75%, about 10% to about 50%, about 10% to about 25%, about 25% to about 100%, about 25% to about 75%, about 25% to about 50%, about 50% to about 100%, about 50% to about 75%, or about 75% to about 100%, increased concentration of metal ions in the subject compared to the concentration of metal ions in a normal subject.

In some embodiments, the abnormal amount of metal ions in the subject refers to about 2 fold to about 10 fold increased concentration of metal ions in the subject compared to the concentration of metal ions in a normal subject, for example, about 2 fold to about 10 fold, about 2 fold to about 8 fold, about 2 fold to about 5 fold, about 2 fold to about 3 fold, about 3 fold to about 10 fold, about 3 fold to about 8 fold, about 3 fold to about 5 fold, about 5 fold to about 10 fold, about 5 fold to about 8 fold, or about 8 fold to about 10 fold, increased concentration of metal ions in the subject compared to the concentration of metal ions in a normal subject.

Methods of determining the concentration of metal ions in a subject are routine in the art and include, for example, measuring metal ions in a cell sample (e.g., NIR microscopy) or tissue sample (e.g., a biopsy sample by NIR spectroscopy) and/or measuring metal ions in the subject using an imaging technique (e.g., magnetic resonance imaging and/or optical fluorescence imaging).

The present application further provides a method of treating a disease associated with an abnormal amount of free metal ions in a subject. In some embodiments, the method comprises administering to the subject a compound provided herein, or a pharmaceutically acceptable salt thereof.

In some embodiments, the disease is associated with an abnormal amount of iron ions, an abnormal amount of lead ions, an abnormal amount of copper ions, an abnormal amount of arsenic ions, an abnormal amount of manganese ions, an abnormal amount of cadmium ions, an abnormal amount of nickel ions, an abnormal amount of chromium ions, an abnormal amount of gold ions, or an abnormal amount of antimony ions in the subject, or any combination thereof. In some embodiments, the disease is associated with an abnormal amount of iron ions, an abnormal amount of lead ions, or an abnormal amount of copper ions in the subject, or any combination thereof.

In some embodiments, the disease is associated with an abnormal amount of iron ions, an abnormal amount of lead ions, or an abnormal amount of copper ions in the subject. In some embodiments, the disease is associated with an abnormal amount of iron ions in the subject.

In some embodiments, the disease is selected from the group consisting of transfusion hemosiderosis (e.g., resulting from blood transfusions in a subject having one or more diseases selected from the group consisting of thalassemia, myelodysplastic syndrome, sickle cell anemia, and Blackfan Diamond anemia), hemochromatosis (e.g., hereditary or acquired), Wilson's disease, copper poisoning, and heavy metal poisoning (e.g., lead poisoning, mercury poisoning, cadmium poisoning, arsenic poisoning, manganese poisoning, and the like).

In some embodiments, the compounds provided herein, or pharmaceutically acceptable salts thereof, are administered to the subject in a therapeutically effective amount. As used herein, the phrase "therapeutically effective amount" refers to the amount of active compound or pharmaceutical agent that elicits the biological or medicinal response that is being sought in a tissue, system, animal, individual or human by a researcher, veterinarian, medical doctor or other clinician.

As used herein, the term "treating" or "treatment" refers to one or more of (1) inhibiting the disease; for example, inhibiting a disease, condition or disorder in an individual who is experiencing or displaying the pathology or symptomatology of the disease, condition or disorder (i.e., arresting further development of the pathology and/or symptomatology); and (2) ameliorating the disease; for example, ameliorating a disease, condition or disorder in an individual who is experiencing or displaying the pathology or symptomatology of the disease, condition or disorder (i.e., reversing the pathology and/or symptomatology) such as decreasing the severity of disease or reducing or alleviating one or more symptoms of the disease.

Pharmaceutical Compositions and Formulations

When employed as pharmaceuticals, the compounds and salts provided herein can be administered via various routes (e.g., intravenous, intranasal, intradermal, or oral administration) in the form of pharmaceutical compositions. These compositions can be prepared as described herein or elsewhere, and can be administered by a variety of routes, depending upon whether local or systemic treatment is desired and upon the area to be treated. In some embodiments, the administration is parenteral. Parenteral administration includes, for example, intravenous, intraarterial, subcutaneous, intraperitoneal intramuscular or injection or infusion; or intracranial administration, (e.g., intrathecal or intraventricular, administration). Parenteral administration can be in the form of a single bolus dose, or may be, for example, by a continuous perfusion pump. In some embodiments, the compounds, salts, and pharmaceutical compositions provided herein are suitable for parenteral administration. In some embodiments, the compounds, salts, and pharmaceutical compositions provided herein are suitable for intravenous administration. Conventional pharmaceutical carriers, aqueous, powder or oily bases, thickeners and the like may be necessary or desirable.

Also provided are pharmaceutical compositions which contain, as the active ingredient, a compound provided herein, or a pharmaceutically acceptable salt thereof, in combination with one or more pharmaceutically acceptable carriers (e.g., excipients). In making the compositions provided herein, the active ingredient is typically mixed with an excipient, diluted by an excipient or enclosed within such a carrier in the form of, for example, a capsule, tablet, or other container. When the excipient serves as a diluent, it can be a solid, semi-solid, or liquid material, which acts as a vehicle, carrier or medium for the active ingredient. Thus, the compositions can be in the form of tablets, pills, powders, suspensions, emulsions, solutions, syrups, aerosols (as a solid or in a liquid medium), soft and hard gelatin capsules, suppositories, sterile injectable solutions, and sterile packaged powders.

Some examples of suitable excipients include, without limitation, lactose, dextrose, sucrose, sorbitol, mannitol, starches, gum acacia, calcium phosphate, alginates, tragacanth, gelatin, calcium silicate, microcrystalline cellulose, polyvinylpyrrolidone, cellulose, water, syrup, and methyl cellulose. The formulations can additionally include, without limitation, lubricating agents such as talc, magnesium stearate, and mineral oil; wetting agents; emulsifying and suspending agents; preserving agents such as methyl- and propylhydroxy-benzoates; sweetening agents; flavoring agents, or combinations thereof.

The active compound can be effective over a wide dosage range and is generally administered in a pharmaceutically effective amount. It will be understood, however, that the amount of the compound actually administered will usually be determined by a physician, according to the relevant circumstances, including the condition to be treated, the chosen route of administration, the actual compound administered, the age, weight, and response of the individual subject, the severity of the subject's symptoms, and the like.

EXAMPLES

The following examples are offered for illustrative purposes, and are not intended to limit the invention.

Example 1. Synthesis of ZW-EPL- and DFO-ZW-EPL- Nanochelators

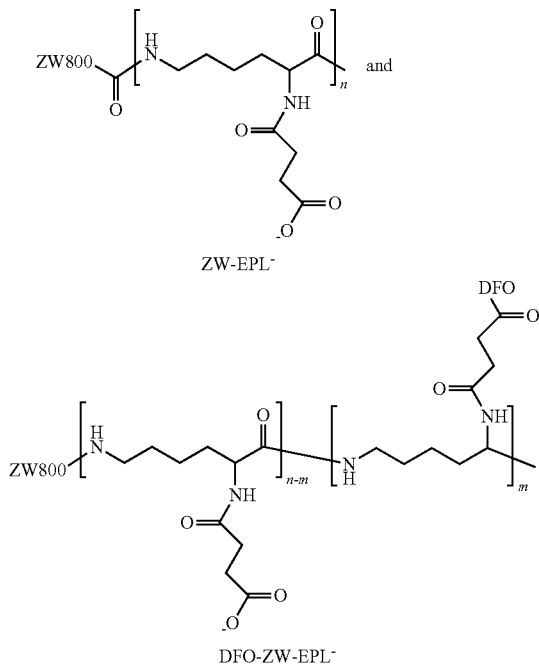

ZW-EPL⁻

DFO-ZW-EPL⁻

Figure 1F:
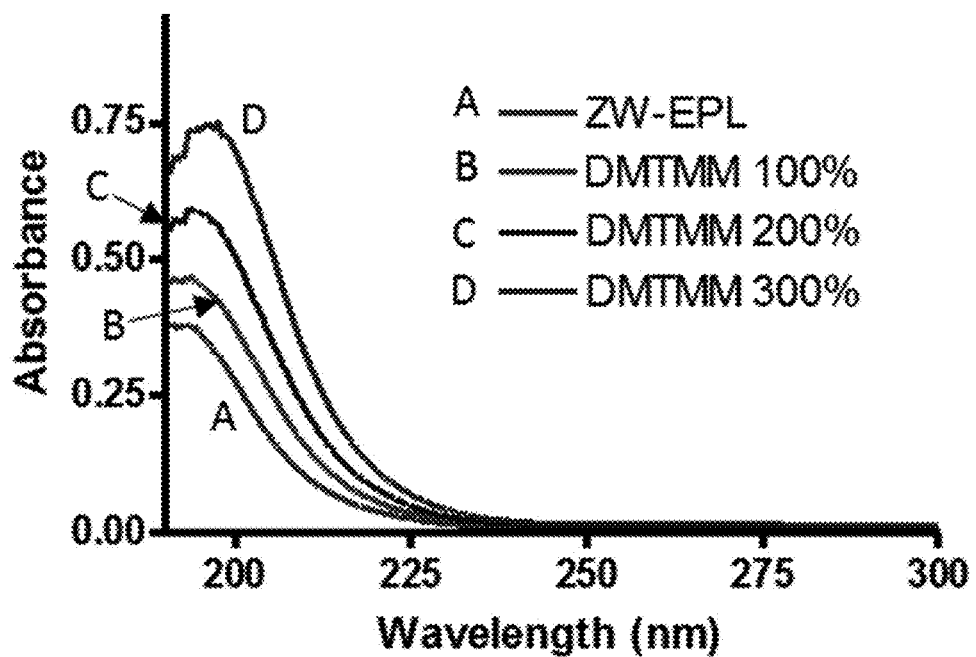
FIGS. 1F-1G show absorbance of the DFO-ZW-EPL- nanochelators measured in a UV assay (FIG. 1F) and an Fe assay (FIG. 1G).
Figure 1G:
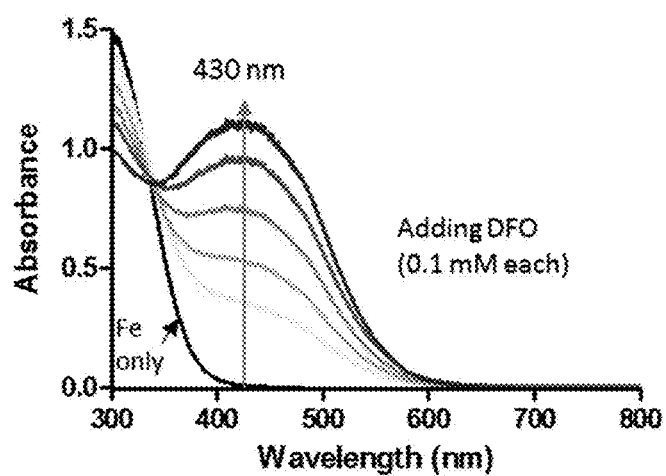

The title compounds were prepared according to the procedure shown in Scheme 1. 16 mg of ZW-EPL- was dissolved in 1.5 mL water and transferred to a 10 mL round bottom flask equipped with a magnetic stirrer. About 15-45 mg of DMTMM was then added to the flask and the reaction mixture was vigorously stirred. After 5-10 min, 36 mg of DFO dissolved in 0.5 mL water in the presence of 30-40 µL of 1 M NaOH (pH ~7.0) was added to the reaction mixture, followed by vigorous stirring for additional 1 hour at 60.° C. The stoichiometry (i.e., conjugation ratio) of DFO on the EPL chain for nanochelator DFO-ZW-EPL~ was 1.6 as confirmed by UV-visible spectroscopy and HPLC (see e.g., FIGS. 1A-1E). Additional DFO-ZW-EPL- nanochelators were also prepared at various stoichiometric ratios of DFO: EPL, and are described below in Table 1. Absorbance spectral changes by adding DFO moieties to the DFO-ZW-EPL- nanochelators were measured at 200 nm (UV assay; FIG. 1F) and the absorbance changes at 430 nm reflected the number of Fe ion binding by the DFO moieties conjugated on the ZW-EPL-nanochelators (Fe assay; FIG. 1G). As shown in Table 1, the stoichiometry measured by the UV assay and Fe assay verified the number of DFO moieties conjugated on the EPL chain.

TABLE 1

| Nanochelator | Abs at 200 nm | DFO Conc. (µM) | Stoichiometry (DFO:EPL) | |
|---|---|---|---|---|
| | | | UV Assay | Fe Assay |
| DFO-EPL-2 | 0.101 | 4.04 | 2.0 | 2.0 |
| DFO-EPL-4 | 0.231 | 9.24 | 4.6 | 3.5 |
| DFO-EPL-8 | 0.424 | 16.96 | 8.5 | 7.5 |

Example 2. In Vitro Iron Binding of Nanochelators

Figures 2A, 2B, 2C:
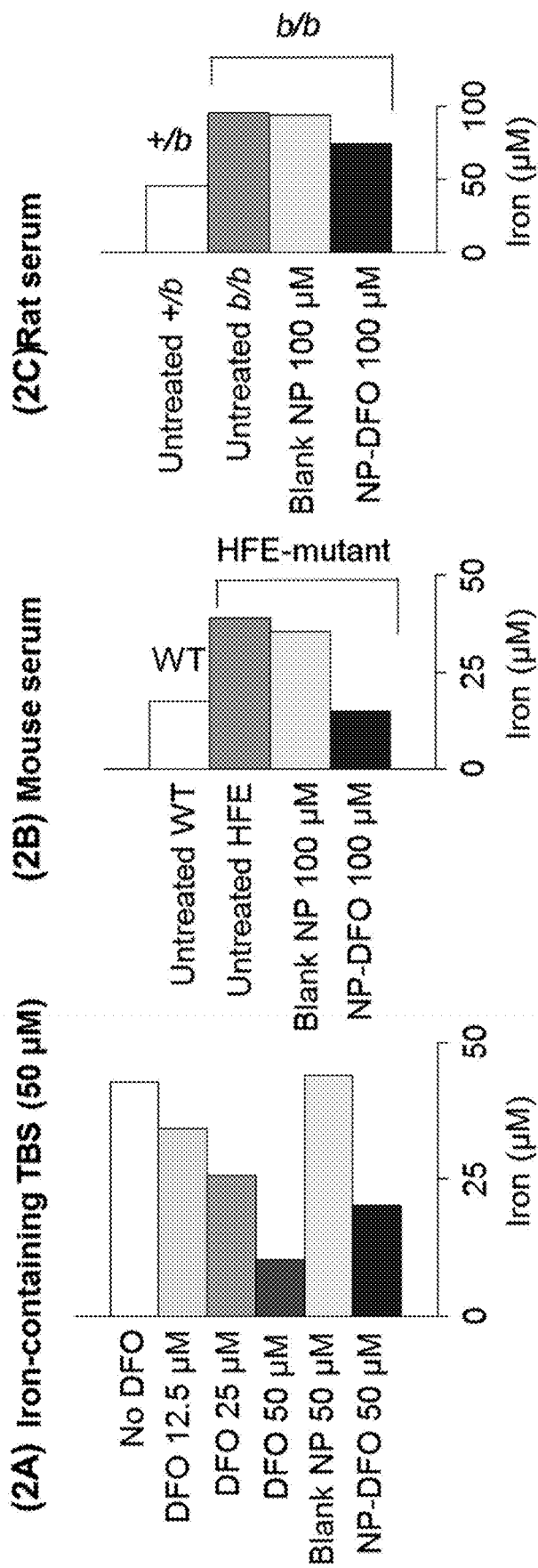
FIGS. 2A-2C shows that the DFO-ZW-EPL- nanochelator decreases iron concentration in serum from iron overloaded animals.

As shown in FIGS. 2A-2C, the DFO-conjugated nanochelator, DFO-ZW-EPL, decreases iron concentrations in serum from iron overloaded animals in three different assays. First, different concentrations of DFO alone (12.5 µM, 25 µM, and 50 µM), blank nanoparticles (i.e. Blank NP) and NP-DFO (50 µM as NP) were mixed with the same volume of iron solution in TBS (50 µM; pH 5.5), followed by non-heme iron analysis. Under these conditions, the DFO-conjugated nanochelator decreased iron concentrations in serum, as shown in FIG. 2A.

In a separate assay, sera from HFE-mutant mice, a mouse model of genetic (primary) iron overload hemochromatosis, and wild-type mice (WT; mixed strain), were incubated with TBS (control), blank NP (100 µM) or NP-DFO (100 µM), followed by non-heme iron analysis. Under these conditions, the DFO-conjugated nanochelator decreased the iron concentration in sera of the HFE-mutant mice, as shown in FIG. 2B.

Finally, sera from homozygous Belgrade (b/b) rats, a rat model of transfusional (secondary) iron overload disorder, and healthy heterozygous control Belgrade (+/b) rats wild-type mice (mixed strain), were incubated with TBS (control), blank NP (100 µM) or NP-DFO (100 µM) before non-heme iron analysis. The DFO-conjugated nanochelator decreased iron concentration in the sera of the homozygous Belgrade (b/b) rats, as shown in FIG. 2C.

Example 3. Biodistribution of Nanochelators in CD-1 Mice

Figure 3A:
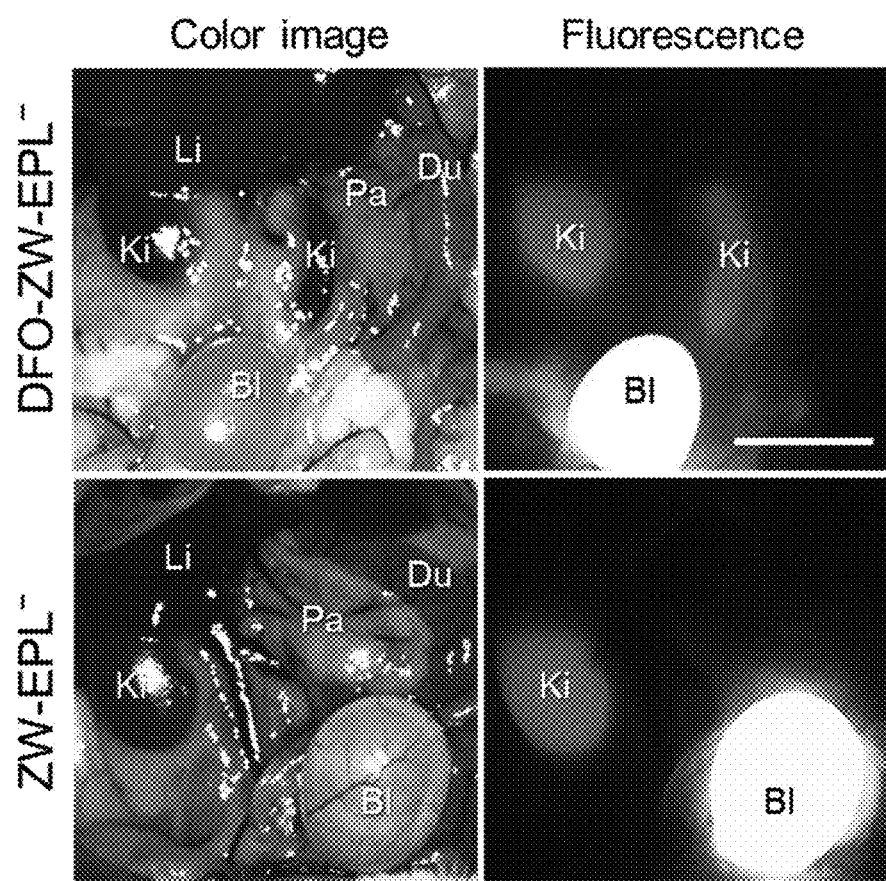
FIGS. 3A-3B show the biodistribution and clearance of ZW-EPL- and DFO-ZW-EPL-in CD-1 mice. Abbreviations: Bl, bladder; Du, duodenum; He, Heart; In, intestine; Ki, kidneys; Li, liver; Lu, lungs; Mu, muscle; Pa, pancreas; Sp, spleen. Scale bars=1 cm.
Figure 3B:
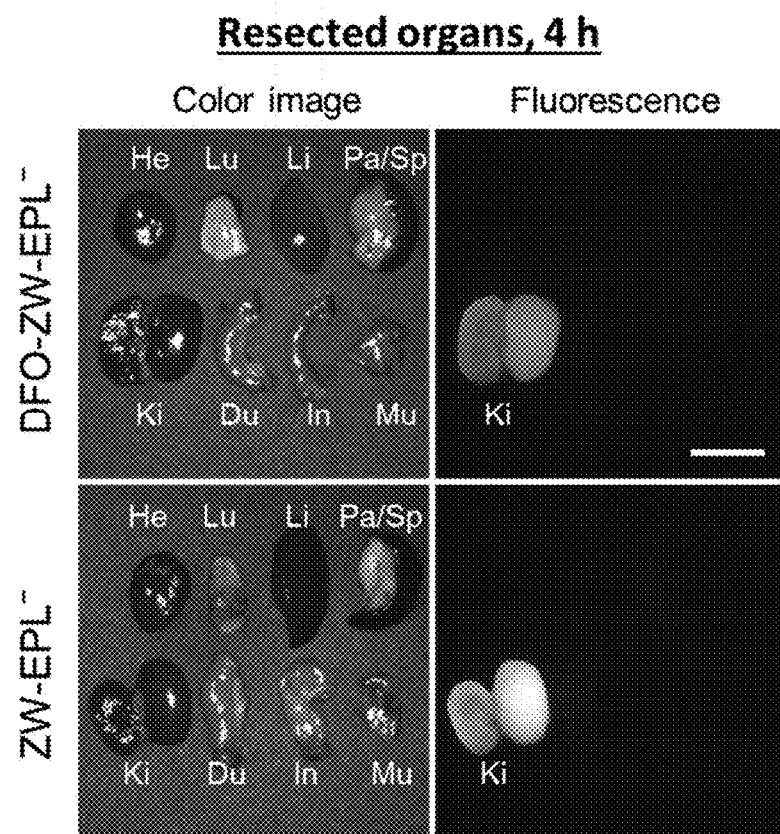

Each nanochelator was injected intravenously into 25 g CD-1 mice (10 nmol; 0.2 mg/kg) 4 h prior to imaging (N=3). As shown in FIGS. 3A-3B, fluorescence images of the abdominal cavity and resected organs show localization of each nanochelator (DFO-ZW-EPL- and ZW-EPL⁻) in the kidney and bladder.

Example 4. Pharmacokinetics of Nanochelators

Figure 4A:
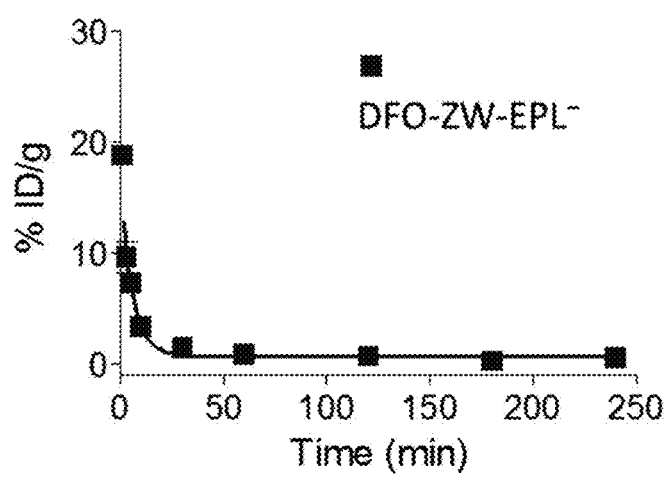
FIGS. 4A-4C show clearance (FIGS. 4A-4B) of ZW-EPL- and DFO-ZW-EPL-over time and biodistribution of the compounds in representative organs (FIG. 4C). Abbreviations: Bl, bladder; Du, duodenum; He, Heart; In, intestine; Ki, kidneys; Li, liver; Lu, lungs; Mu, muscle; Pa, pancreas; Sp, spleen.
Figure 4B:
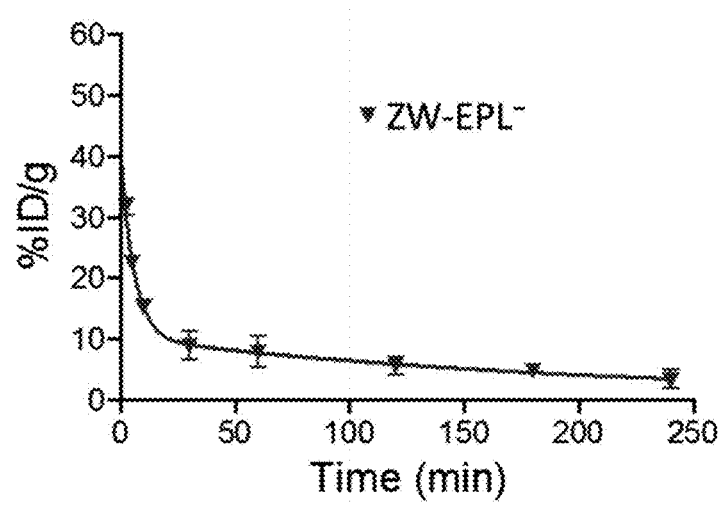
Figure 4C:
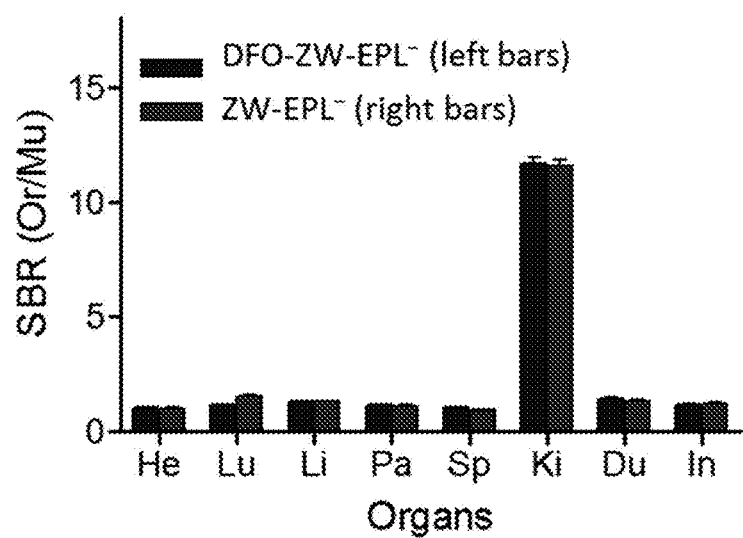

An overview of the pharmacokinetics of nanochelators ZW-EPL⁻ and DFO-ZW-EPL⁻ are shown below in Table 2, and in FIGS. 4A-4C.

TABLE 2

| | DFO-ZW-EPL⁻ | ZW-EPL⁻ |
|---|---|---|
| MW (g/mol) | ~8,700 | ~7,600 |
| D (µg) | 87 | 76 |
| K (/min) | 0.0140 | 0.0049 |
| $T_{1/2}$ α (min) | 3.44 ± 0.26 | 3.98 ± 0.25 |
| $T_{1/2}$ β (min) | 49.46 ± 29.93 | 140 ± 86 |
| Urinary excretion (% ID) | 45.44 | 64.46 |
| AUC (% ID min) | 224.2 | 1677 |
| Plasma clearance (mL/min) | 0.446 | 0.060 |
| volume of distribution (mL) | 31.83 | 12.13 |

Figure 5A:
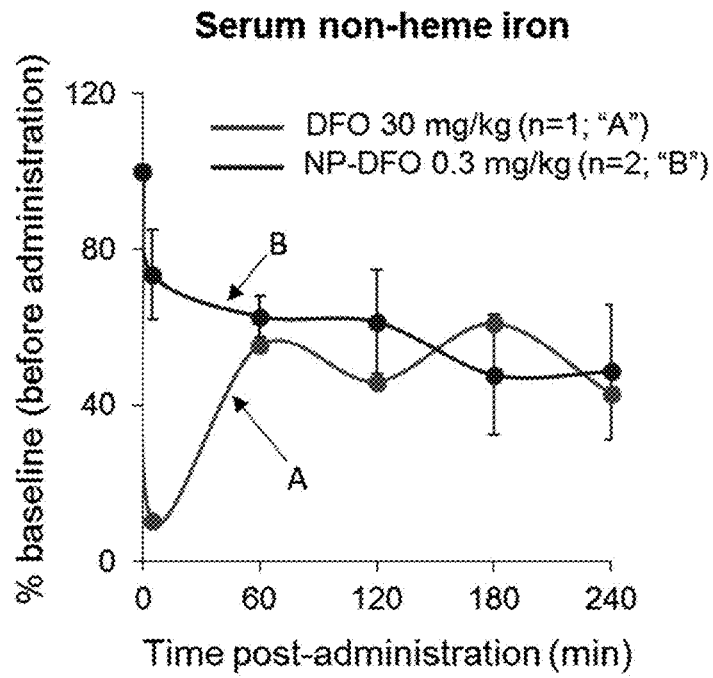
FIGS. 5A-5B shows in vivo iron chelation effects of DFO-ZW-EPL- in dietary iron overloaded rats. Serum iron and liver non-heme iron levels were quantified by non-heme iron analysis.
Figure 5B:
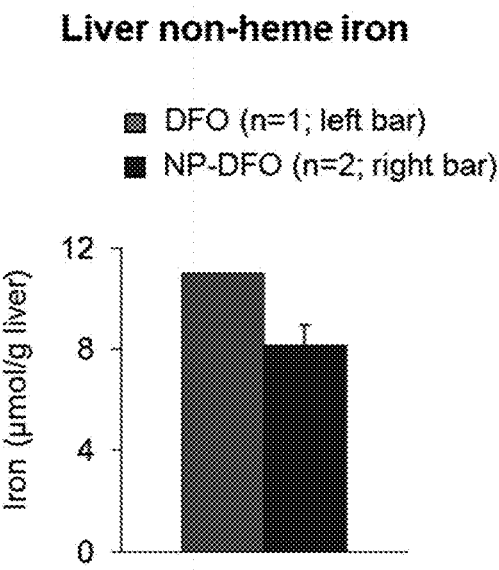

Example 5. In Vivo Iron Chelation Effect of Nanochelators in Dietary Iron Overload Rats Rats (female) were treated with iron loading diet (10,000 ppm) for 2 weeks prior to the experiment. DFO (30 mg/kg) and DFO-ZW-EPL- (0.3 mg/kg as DFO and 1 µmol/kg as NP) were filtered and injected (i.v.) through tail vein (1 mL/kg). Blood was collected at 5 min, 1 h, 2 h, 3 h and 4 h post-administration. After 4 h, rats were euthanized and tissues were collected. Serum iron and liver non-heme iron levels were quantified by non-heme iron analysis. As shown in FIGS. 5A-5B, administration of compound DFO-ZW-EPL-increased in vivo iron chelator efficacy in serum by approximately 100 fold compared to administration of free DFO (FIG. 5A) and reduced the measured levels of liver non-heme iron compared to administration of DFO alone (FIG. 5B).

Figure 6A:
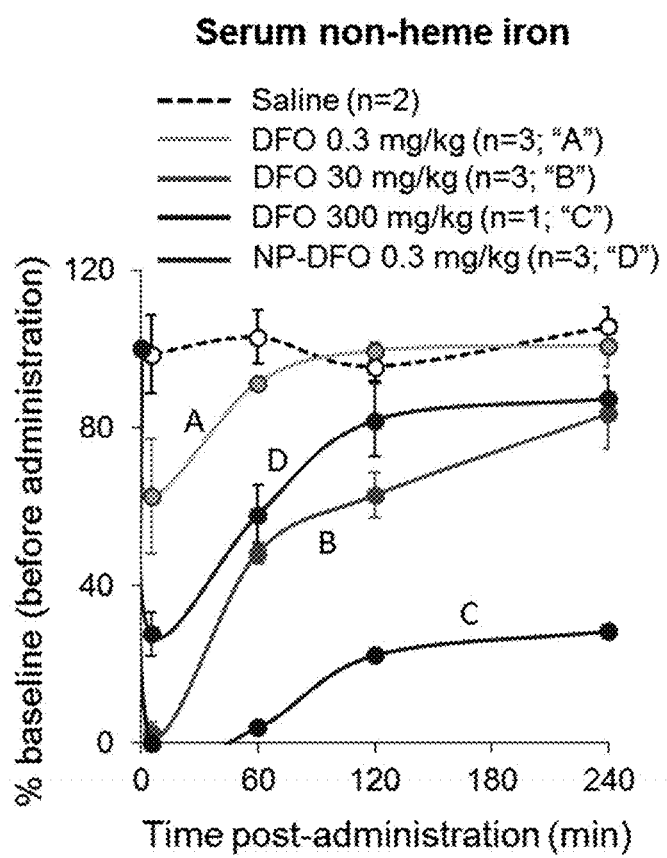
FIGS. 6A-6B shows in vivo iron chelation effects of DFO-ZW-EPL- in HFE mutant mice with genetic iron overload.
Figure 6B:
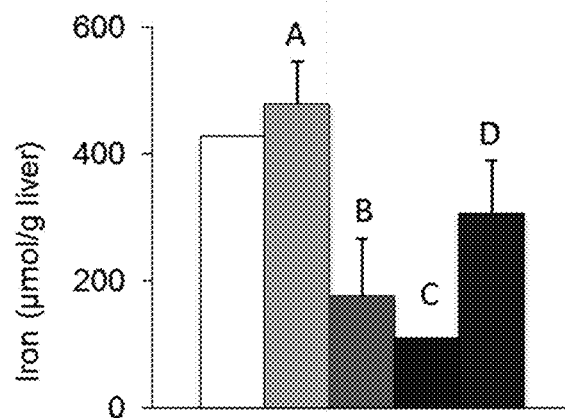

Example 6. In Vivo Iron Chelation Effect of Nanochelators in Mice with Genetic Iron Overload Nanochelators display improved iron chelation effect in a mouse model of iron overload hemochromatosis. HFE mutant mice (male and female), a mouse model of genetic iron overload, were intravenously injected through the tail vein with saline (no DFO), DFO alone (0.3 mg/kg, 30 mg/kg and 300 mg/kg) or DFO-ZW-EPL- (i.e., NP-DFO; 0.3 mg/kg as DFO and 1 µmol/kg as NP). Blood was taken at 5 min, 1 h, 2 h, 3 h, and 4 h. After 4 hours, mice were euthanized and tissues were collected. Serum iron and liver non-heme iron levels were quantified by non-heme iron analysis, as shown in FIGS. 6A-6B.

Figure 6C:
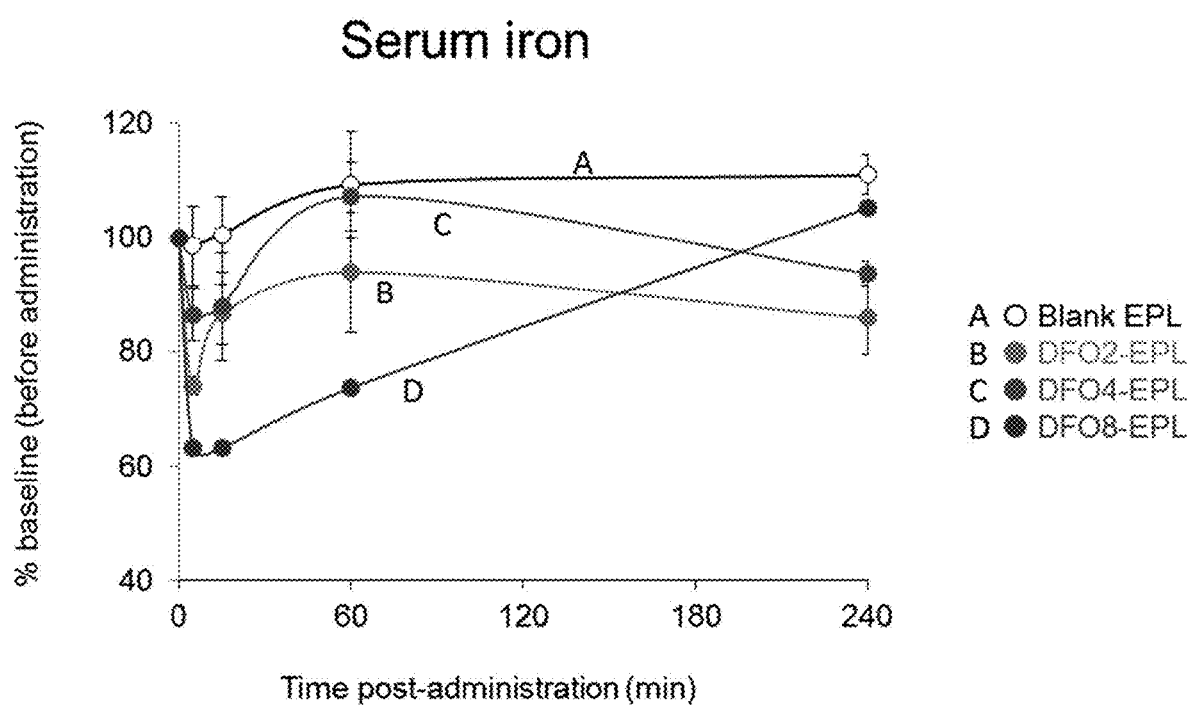
FIGS. 6C-6D show in vivo effects on serum iron levels in HFE mutant mice administered DFO-ZW-EPL- nanochelators.

In a separate assay, HFE-mutant mice (n=2/group for EPL; n=3 for DFO-EPL-2 and DFO-EPL-4; n=1 for DFO-EPL-8) were administered by intravenous (i.v.) injection with EPL (1 µmol/kg) or DFO-EPL (1 µmol/kg as of EPL). Blood was collected at designated time points post-administration. Serum iron levels were quantified by colorimetric analysis and the data are shown in FIG. 6C (mean±SEM). Serum iron levels were significantly decreased within 4 h in DFO-EPL-8 treated mice (DFO:NP stoichiometry=8:1), but not in mice treated with blank NPs.

Figure 6D:
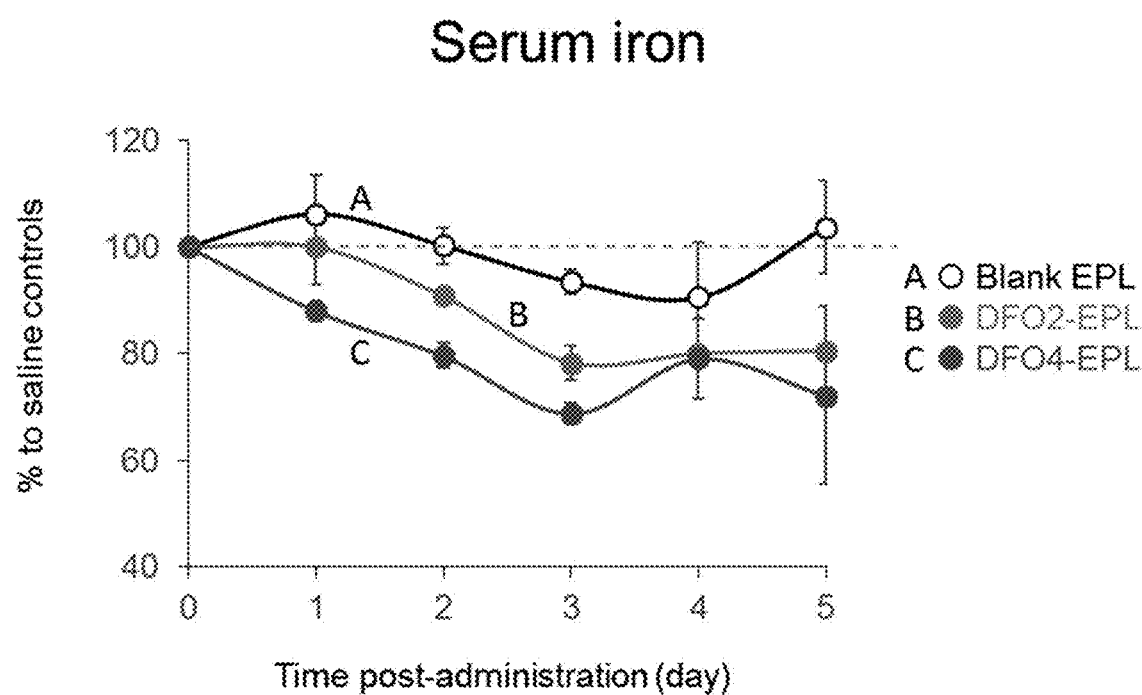

In a separate assay, HFE-deficient mice were administered by subcutaneous (s.c.) injection with saline, blank EPL (1 µmol/kg), DFO-EPL-2 and DFO-EPL-4 (1 µmol/kg as of EPL) (n=2/group). Blood was taken before dosing at designated time points for 5 days and normalized to values from the saline-treated control group. Serum iron levels were quantified by colorimetric analysis, and the data are shown in FIG. 6D (mean±SEM). Again, DFO-NPs decreased serum iron in a dose-dependent manner whereas blank NPs did not, indicating that the DFO-NPs can decrease iron burden in iron overload disorders.

Figure 7A:
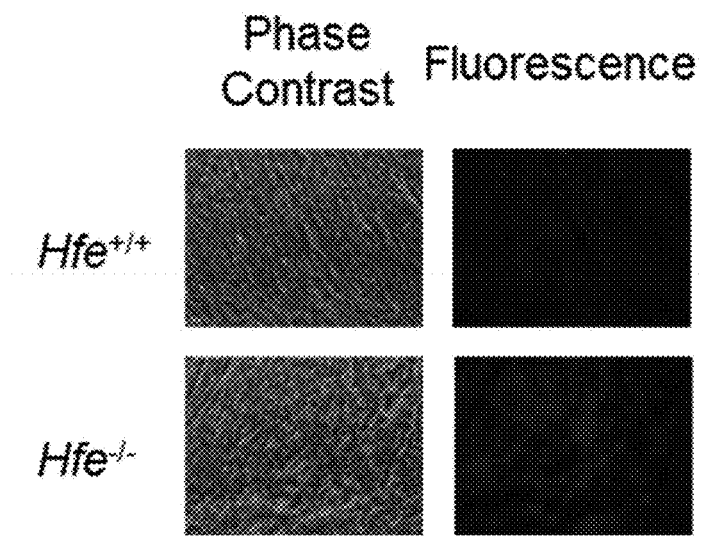
FIGS. 7A-7B show that DFO-ZW-EPL may correct cardiac hypertrophy in HFE-knockout mice.
Figure 7B:
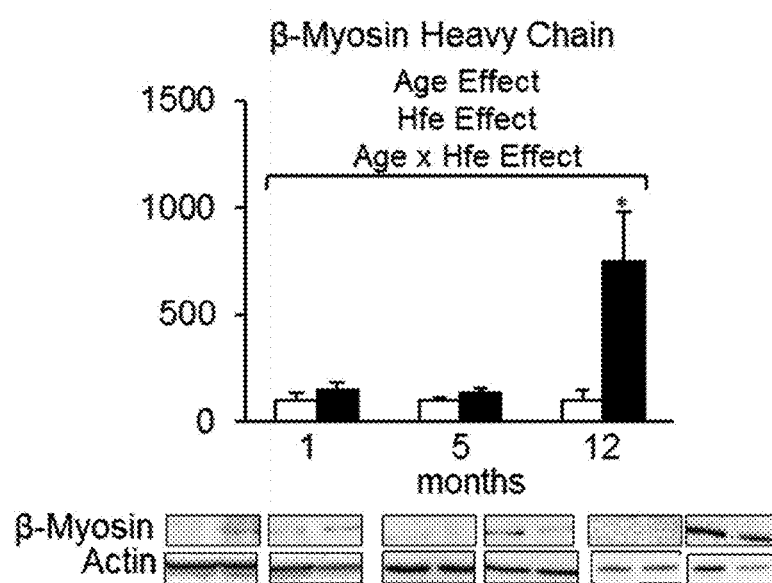
Figures 8A, 8B, 8C, 8D:
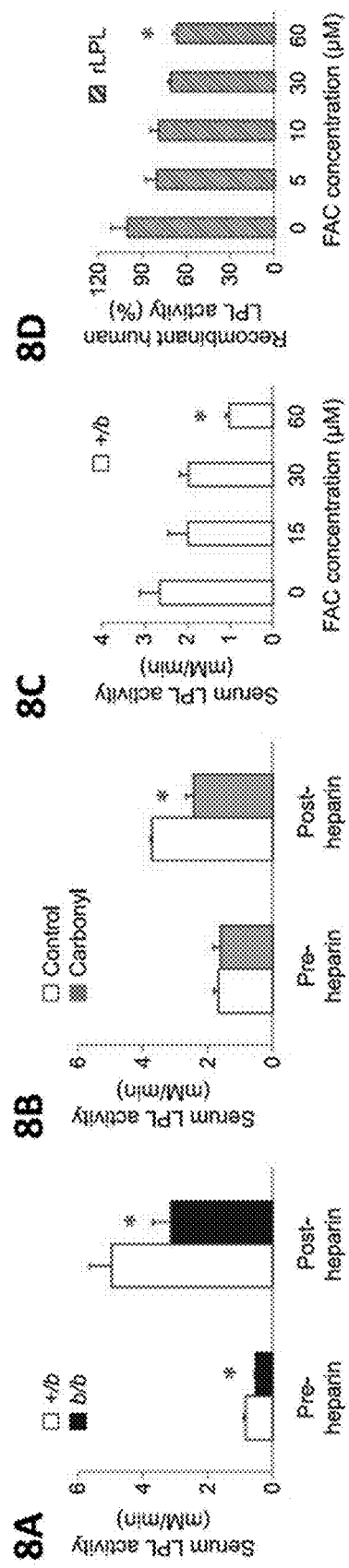
FIGS. 8A-8G show that DFO-ZW-EPL- may correct dyslipidemia in Belgrade rats.
Figures 8E, 8F, 8G:
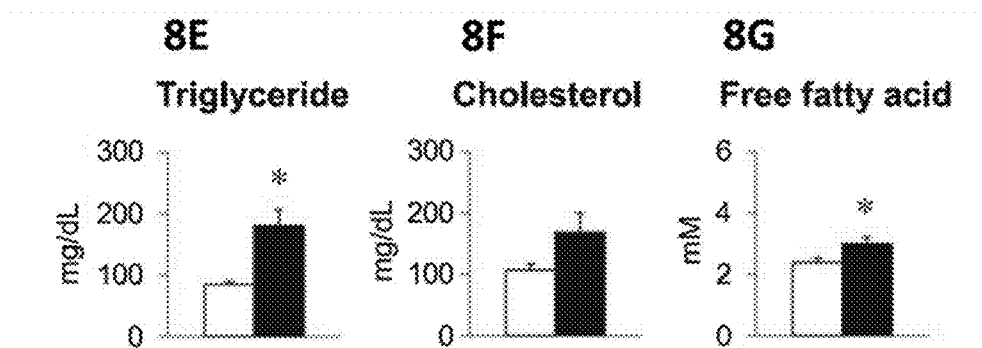

Example 7. Therapeutic Efficacy of Nanochelators in Cardiac Hypertrophy Associated with Iron Overload It will be determined if the nanochelators (e.g., DFO-ZW-EPL⁻) correct cardiac hypertrophy in HFE-knockout mice after repeated/sub-chronic dosing and by dose-response relationships). Measurements may include: heart/body weight ratio, fluorescent microscopy for cardiac hypertrophy, western blot analysis, hypertrophic gene expression, levels of oxidative stress markers, and serum cardiac troponin levels (see e.g., FIGS. 7A-7B).

Example 8. Efficacy of Nanochelators in Impaired Lipid Metabolism Associated with Iron Overload It will be determined if the nanochelators (e.g., DFO-ZW-EPL~) restore dyslipidemia in Belgrade rats after repeated/sub-chronic dosing and by dose-response relationships). Measurements may include: blood glucose levels, cholesterol levels, triglyceride levels, free fatty acid levels, lipoprotein lipase activity, and cardiac hypertrophy (see e.g., FIGS. 8A-8G).

Figure 9:
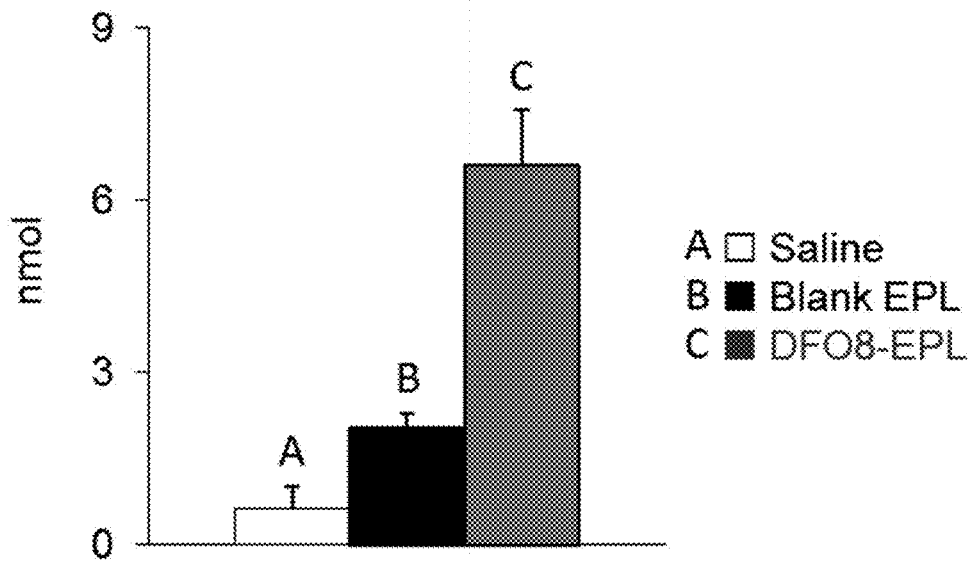
FIG. 9 shows in vivo iron recovery in urine in CD-1 mice treated with iron-dextran and DFO-ZW-EPL- nanochelators.

Example 9. In Vivo Iron Chelation Effect of Nanochelators in Mice with Transfusional Iron Overload The efficacy of DFO-NPs was evaluated in mice that were treated with iron-dextran, a model of transfusional iron overload (see e.g., Imran ul-haq et al, *ACS Nano*, 2013, 7:10704-10716; and Liu et al, *ACS. Appl. Mater. Interfaces*, 2016, 8:25788-25797). CD-1 mice were pretreated with iron dextran (100 mg/kg) by intraperitoneal injection and then intravenously injected with DFO-NPs, blank NPs (1 µmol as NP/kg) or saline 4 h post-iron dextran treatment. Urine was collected for 4 h after NP administration to determine renal excretion of iron. Iron recovery in urine was significantly increased in DFO-NP administered mice compared with saline- or blank NP-injected mice as shown in FIG. 9, confirming that the DFO-NPs collected excessive iron from circulation and excreted via urine. The pharmacokinetics of DFO-NPs in CD-1 mice demonstrated that over 40% of injected dose of DFO-NPs was excreted into urine within 4 h after intravenous injection with negligible distribution in other organs.

Figure 10:
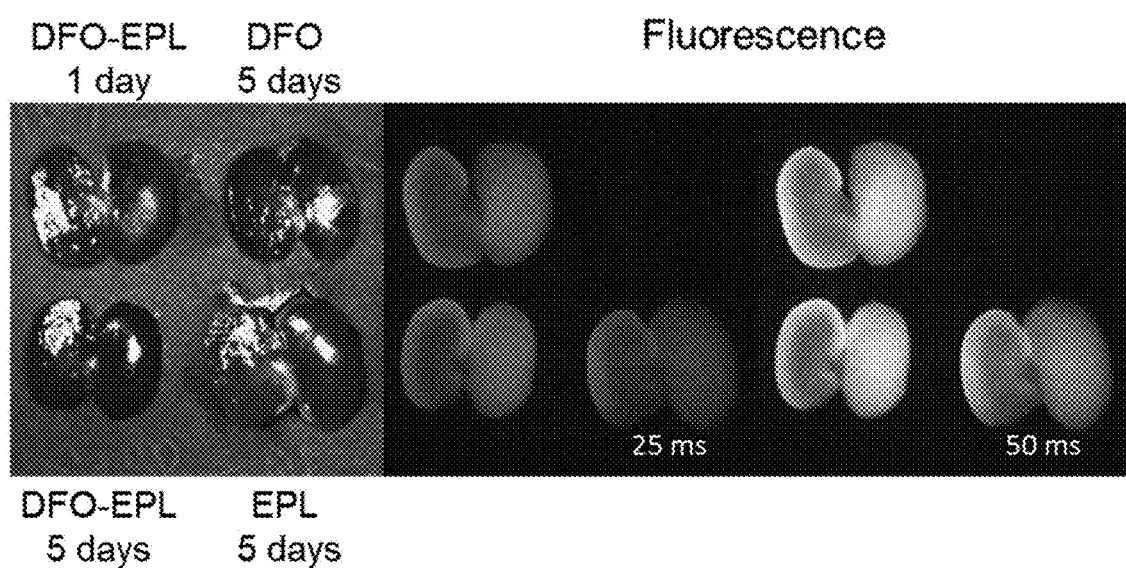
FIG. 10 shows representative optical and NIR fluorescence images of kidneys from CD-1 mice treated with iron-dextran and DFO-ZW-EPL- nanochelators in single dose and multi-dose experiments.

In a separate assay, CD-1 mice were administered by subcutaneous (s.c.) injection with native DFO alone (8 µmol/kg), blank EPL (1 µmol/kg), DFO-EPL-8 (1 µmol/kg as EPL) daily for 5 days. Another CD-1 mouse was injected a single dose of DFO-EPL (1 µmol/kg). One day after last dose, the mice were euthanized, followed by NIR fluorescence. The amount of DFO-NPs found in the kidney was not different between single-dose and multi-dose studies, as shown in FIG. 10. Without being bound by any theory, this data is believed to show that the NPs are rapidly excreted without significant accumulation in the kidney.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A compound of Formula I:

A-B        I or a pharmaceutically acceptable salt thereof, wherein:
A is selected from A-3, A-4, A-5, and A-6:

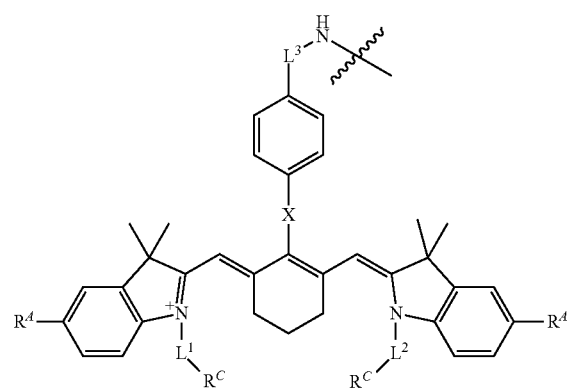

A-3

-continued

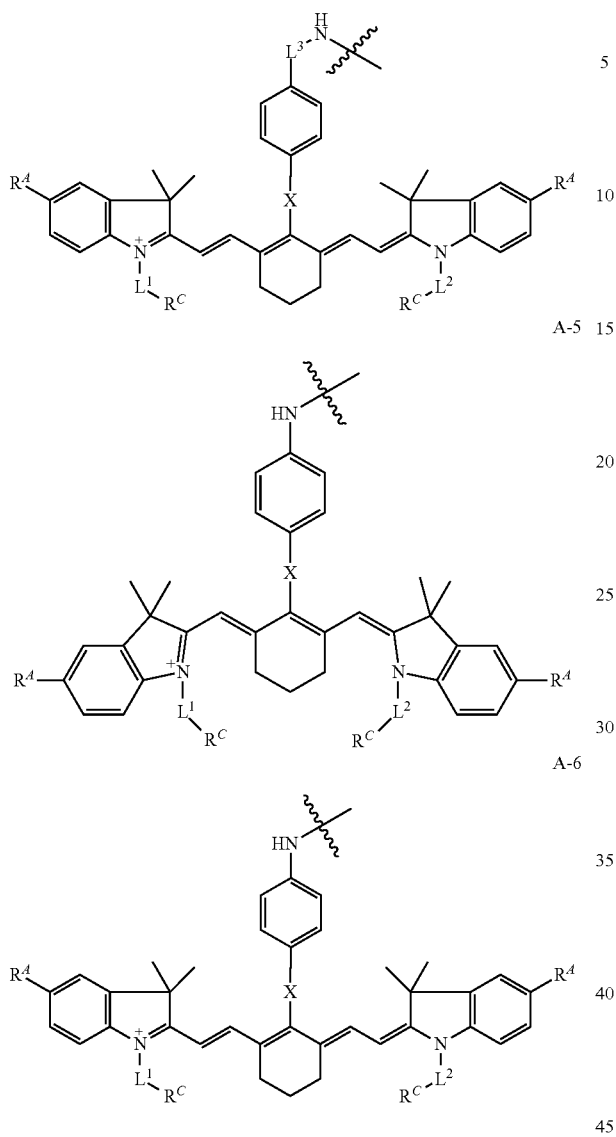

wherein:
~~~ indicates the bond between A and B;
X is selected from the group consisting of a bond, C, CH₂, NH, —NH—C$_{1-6}$ alkylene-, O and S;
each R$^A$ is an independently selected anionic group selected from oxide, carbonate, carboxylate, phosphate, sulfide, sulfinate, and sulfonate;
each R$^C$ is an independently selected cationic group selected from ammonium, C$_{1-6}$ alkylammonium, di(C$_{1-6}$ alkyl)ammonium, and tri(C$_{1-6}$ alkyl)ammonium; and
L$^1$, L$^2$, and L$^3$ are each an independently selected C$_{1-6}$ alkylene group;
B is a biocompatible polymer substituted by one or more C groups and one or more -D-E groups;
each C is independently selected from the group consisting of H and an anionic group;
each D is an independently selected linking group; and
each E is an independently selected metal chelating group.

2. The compound of claim 1, wherein X is selected from bond, NH, —NH—C$_{1-6}$ alkylene-, O and S.

3. The compound of claim 1, wherein each R$^C$ is an independently selected tri(C$_{1-6}$ alkyl)ammonium group.

4. The compound of claim 1, wherein each R$^A$ is a sulfonate.

5. The compound of claim 1, wherein each L$^1$ and L$^2$ are independently a propylene, and L$^3$ is ethylene.

6. The compound of claim 1, wherein A is selected from:

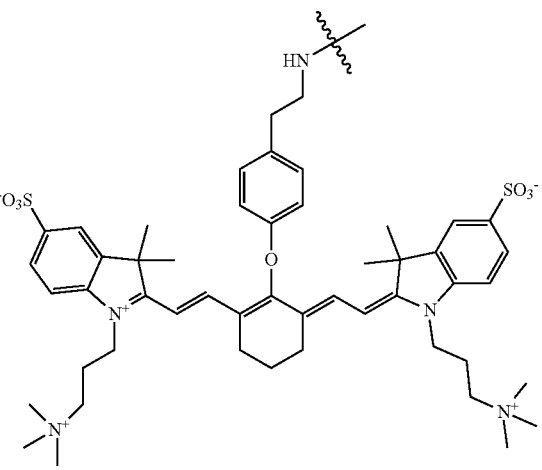

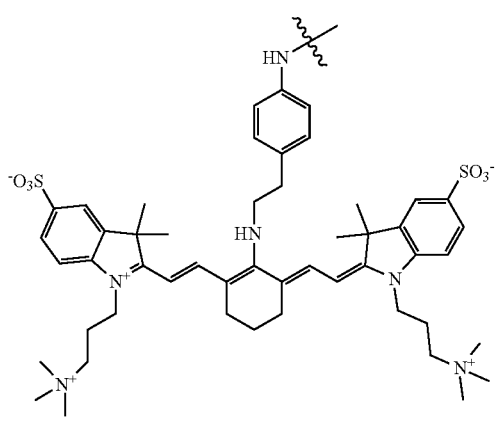

-continued

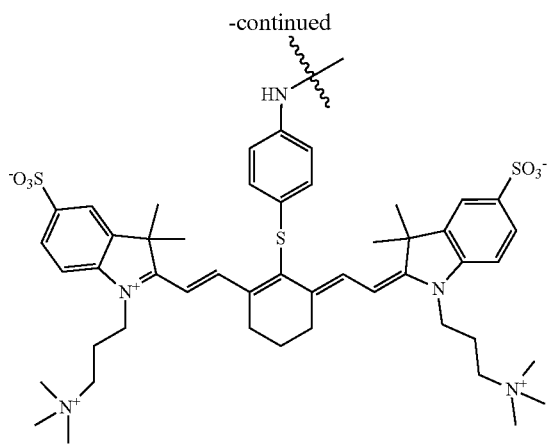

and

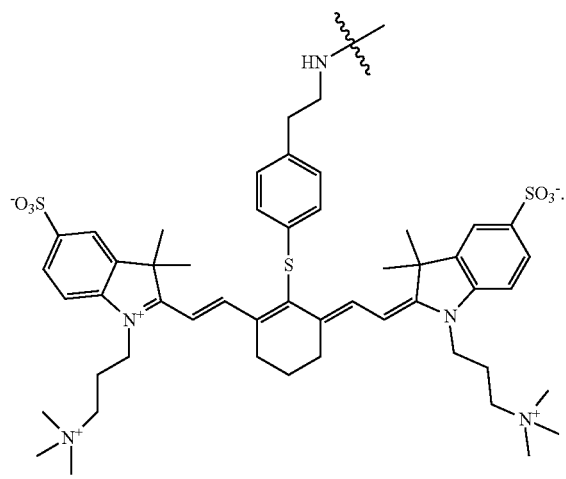

7. The compound of claim 1, wherein B is selected from the group consisting of polylysine, polylactic acid, poly(lactic-co-glycolic acid), polyaspartic acid, polyglutamic acid, and polyglutamic acid-poly(ethylene glycol) copolymer, each of which is substituted by one or more C groups and one or more -D-E groups.

8. The compound of claim 1, wherein B is polylysine substituted by one or more C groups and one or more -D-E groups.

9. The compound of claim 1, wherein B is:

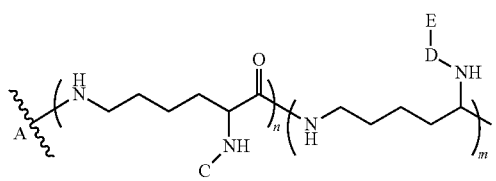

wherein:

$\overset{A}{\sim\!\sim\!\sim}$ indicates the bond between B and A; and n is an integer from 5 to 30; and m is an integer from 1 to 10.

10. The compound of claim 1, wherein each C is independently selected from the group consisting of hydrogen and an anionic group comprising one or more alkylene groups, one or more carbonyl groups, or one or more carboxyl groups, or any combination thereof.

11. The compound of claim 1, wherein C is an anionic group of the following formula:

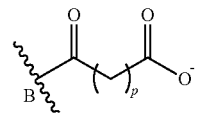

wherein:

$\overset{B}{\sim\!\sim\!\sim}$ indicates the bond between C and B; and p is an integer from 1 to 10.

12. The compound of claim 1, wherein D is a linking group comprising one or more alkylene groups, one or more carbonyl groups, or one or more carboxyl groups, or any combination thereof.

13. The compound of claim 1, wherein D is a linking group of the following formula:

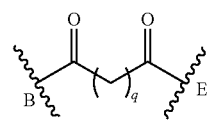

wherein:

$\overset{B}{\sim\!\sim\!\sim}$ indicates the bond between D and B;

$\overset{E}{\sim\!\sim\!\sim}$ indicates the bond between D and E; and q is an integer from 1 to 10.

14. The compound of claim 1, wherein E is selected from the group consisting of an iron chelating group, a lead chelating group, a copper chelating group, an arsenic chelating group, a mercury chelating group, and a manganese chelating group.

15. The compound of claim 1, wherein E is an iron chelating group.

16. The compound of claim 1, wherein E is selected from the group consisting of dimercaptosuccinic acid, dimercaprol, ethylenediaminetetraacetic acid, P-aminosalicyclic acid, D-penicillamine, deferoxamine, deferiprone, and deferasirox.

17. The compound of claim 1, wherein E is deferoxamine.

18. The compound of claim 1, wherein:

B is selected from the group consisting of polylysine, polylactic acid, poly(lactic-co-glycolic acid), polyaspartic acid, polyglutamic acid, and polyglutamic acid-poly(ethylene glycol) copolymer, each of which is substituted by one or more C groups and one or more -D-E groups;

C is an anionic group of the following formula:

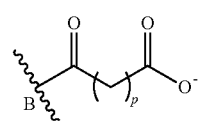

wherein:

$\overset{B}{\sim}$ indicates the bond between C and B;

p is an integer from 1 to 10;

D is a linking group of the following formula:

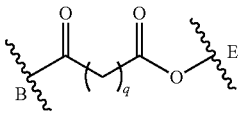

wherein:

$\overset{B}{\sim}$ indicates the bond between D and B;

$\overset{E}{\sim}$ indicates the bond between D and E; and q is an integer from 1 to 10; and E is selected from the group consisting of an iron chelating group, a lead chelating group, a copper chelating group, an arsenic chelating group, a mercury chelating group, and a manganese chelating group.

19. A pharmaceutical composition comprising the compound of claim 1, or a pharmaceutically acceptable salt thereof, and a pharmaceutically acceptable carrier.

20. A method of chelating metal ions in a subject, the method comprising administering to the subject a therapeutically effective amount of a compound of claim 1, or a pharmaceutically acceptable salt thereof.

21. A method of treating a disease associated with an abnormal amount of free metal ions in a subject, comprising administering to subject determined to have an abnormal level of free metal ions a compound of claim 1, or a pharmaceutically acceptable salt thereof.

* * * * *

UNITED STATES PATENT AND TRADEMARK OFFICE
CERTIFICATE OF CORRECTION

PATENT NO. : 11,702,545 B2
APPLICATION NO. : 17/733766
DATED : July 18, 2023
INVENTOR(S) : Hak Soo Choi, Jonghan Kim and Georges El Fakhri It is certified that error appears in the above-identified patent and that said Letters Patent is hereby corrected as shown below:

On the Title Page

Column 2 (item (56) Other Publications), Line 16, delete "poly(carbosybetaine" and insert
-- poly(carboxybetaine --

Signed and Sealed this
Twelfth Day of September, 2023

Katherine Kelly Vidal
*Director of the United States Patent and Trademark Office*